US010995936B1

United States Patent
Breedlove

(10) Patent No.: US 10,995,936 B1
(45) Date of Patent: May 4, 2021

(54) FULLY ADJUSTABLE LANDSCAPE LIGHTING SYSTEM

(71) Applicant: Volt, LLC, Tampa, FL (US)

(72) Inventor: Michael Grant Breedlove, Odessa, FL (US)

(73) Assignee: VOLT, LLC, Tampa, FL (US)

( * ) Notice: Subject to any disclaimer, the term of this patent is extended or adjusted under 35 U.S.C. 154(b) by 0 days.

(21) Appl. No.: 16/511,753

(22) Filed: Jul. 15, 2019

Related U.S. Application Data

(60) Provisional application No. 62/697,717, filed on Jul. 13, 2018.

(51) Int. Cl.
| | |
|---|---|
| F21V 14/00 | (2018.01) |
| F21S 8/08 | (2006.01) |
| F21K 9/238 | (2016.01) |
| H05B 45/10 | (2020.01) |
| F21W 131/10 | (2006.01) |
| F21W 111/023 | (2006.01) |

(52) U.S. Cl.
CPC ............ *F21V 14/00* (2013.01); *F21K 9/238* (2016.08); *F21S 8/081* (2013.01); *H05B 45/10* (2020.01); *F21W 2111/023* (2013.01); *F21W 2131/10* (2013.01)

(58) Field of Classification Search
CPC ......... F21V 14/00; F21K 9/238; H05B 45/10; F21S 8/081
See application file for complete search history.

(56) References Cited

U.S. PATENT DOCUMENTS

| | | | |
|---|---|---|---|
| 9,869,459 B2 * | 1/2018 | Lentine | F21S 8/081 |
| 10,330,294 B2 * | 6/2019 | Erdener | F21V 9/00 |
| 10,364,792 B2 | 7/2019 | Breedlove, Sr. et al. | |
| 2005/0152127 A1 | 7/2005 | Kamiya et al. | |
| 2006/0023454 A1 * | 2/2006 | Koren | F21K 9/00 362/253 |
| 2014/0056028 A1 | 2/2014 | Nichol et al. | |
| 2017/0191630 A1 * | 7/2017 | Lentine | F21V 23/001 |

OTHER PUBLICATIONS

"Luxor Accessiories Wi-Fi System Components," owner's manual, Jul. 2018, Hunter Industries Incorporated, all enclosed pages cited.
"Luxor Owner's Manual, LED Landscape Lighting Controller, Owner's Manual and Installation Instructions for Luxor Lighting Controller," FXLuminaire, Jun. 2018, Hunter Industries Incorporated, all enclosed pages cited.
"Unique Lighting Systems' New Vivid Series Lamps," published in Landscape Business on May 24, 2018, accessed Jan. 31, 2020 at https://landscape-business.com/unique-lighting-systems-new-vivid-series-lamps/, all enclosed pages cited.

* cited by examiner

*Primary Examiner* — Anabel Ton
(74) *Attorney, Agent, or Firm* — Nelson Mullins Riley & Scarborough LLP

(57) ABSTRACT

A landscape lighting system comprises a plurality of landscape lighting fixtures, wherein each of the landscape lighting fixtures comprise a light source and circuitry. The circuitry is configured to receive a combined power and control signal over power supply wiring, separate the control signal from a power component of the combined signal, and cause the light source to be controlled based on the control signal.

22 Claims, 19 Drawing Sheets

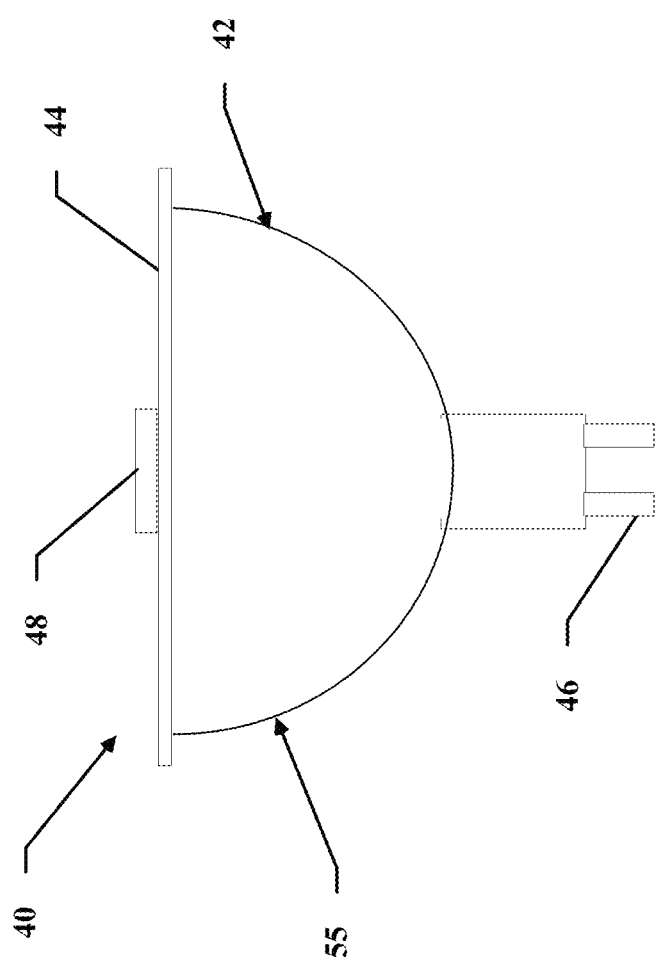

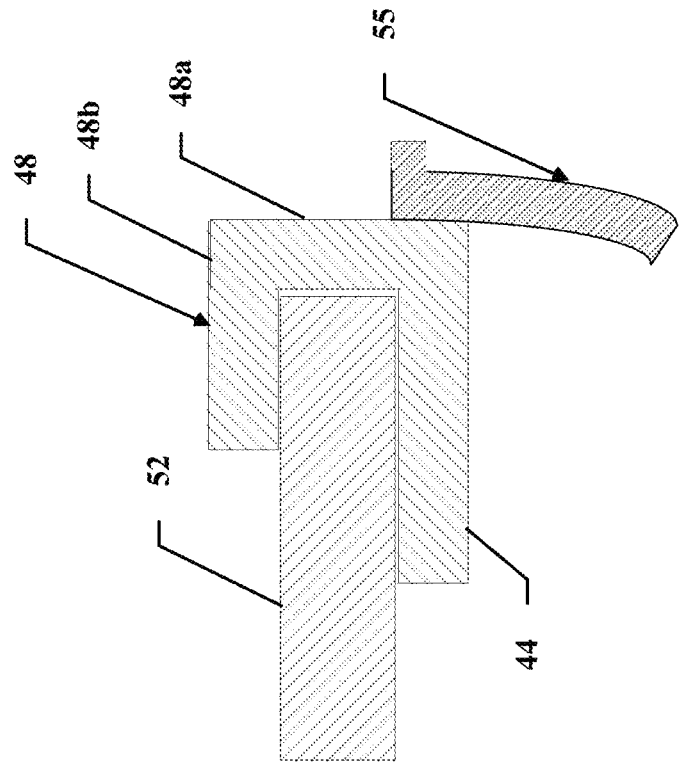
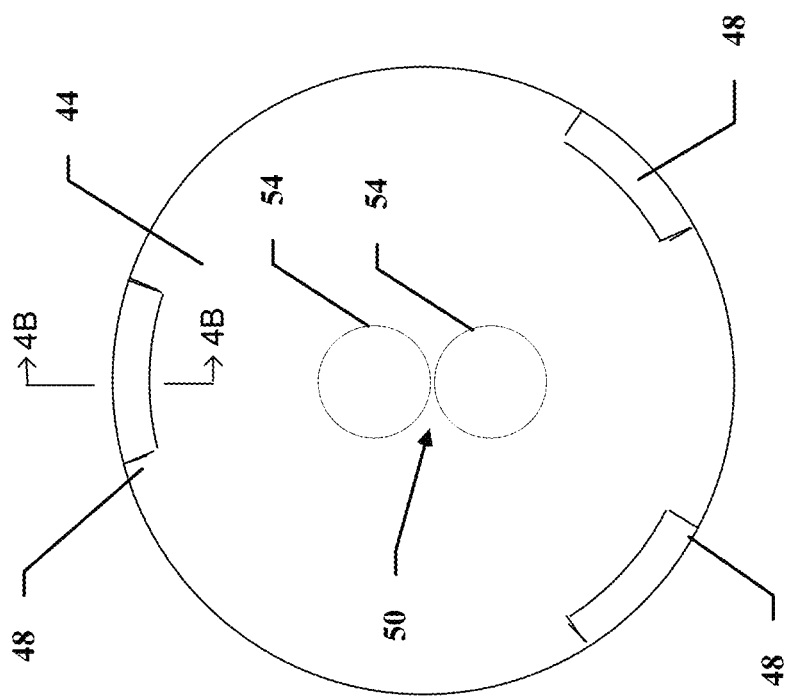
FIG. 4B
FIG. 4A

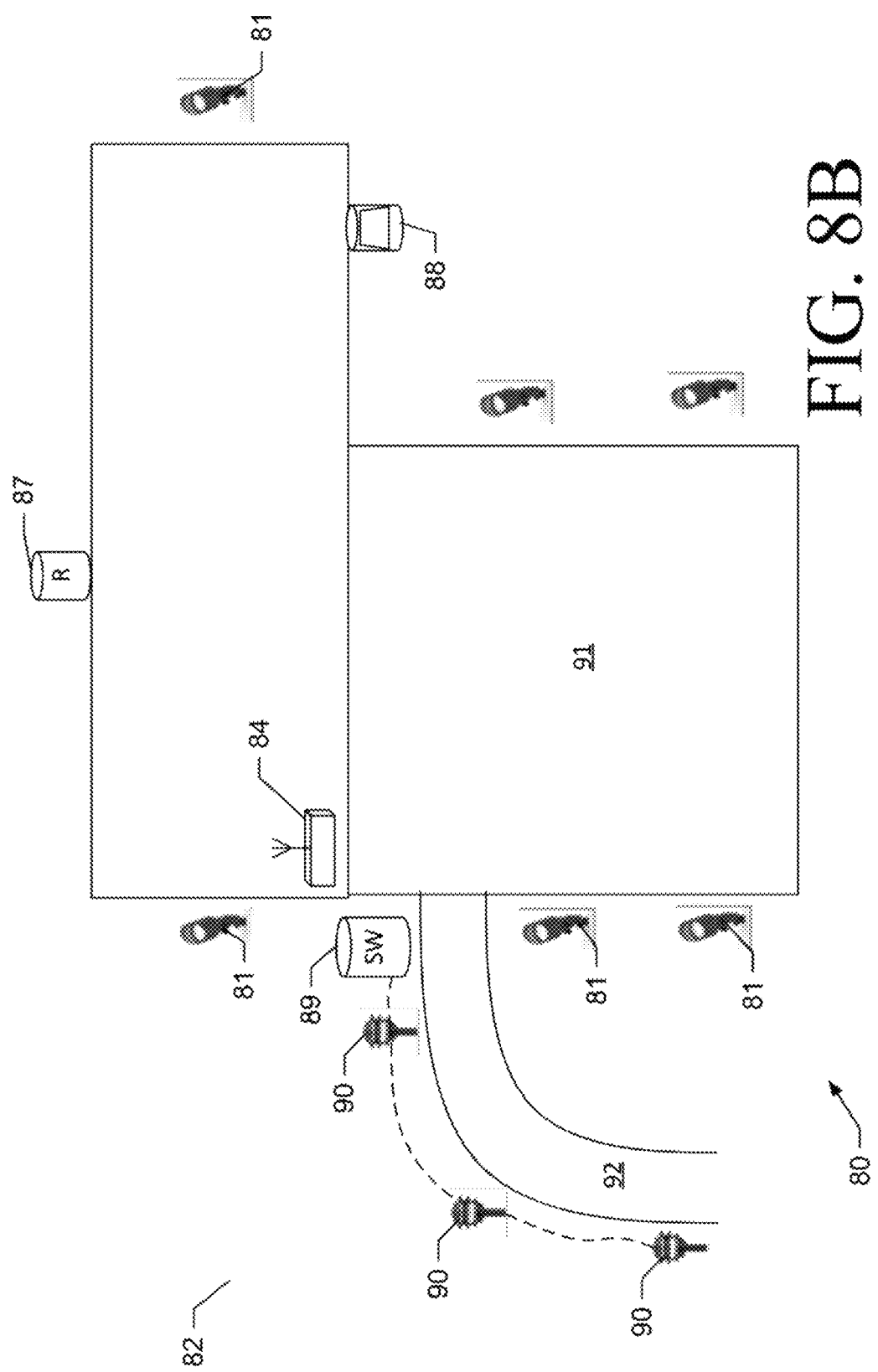

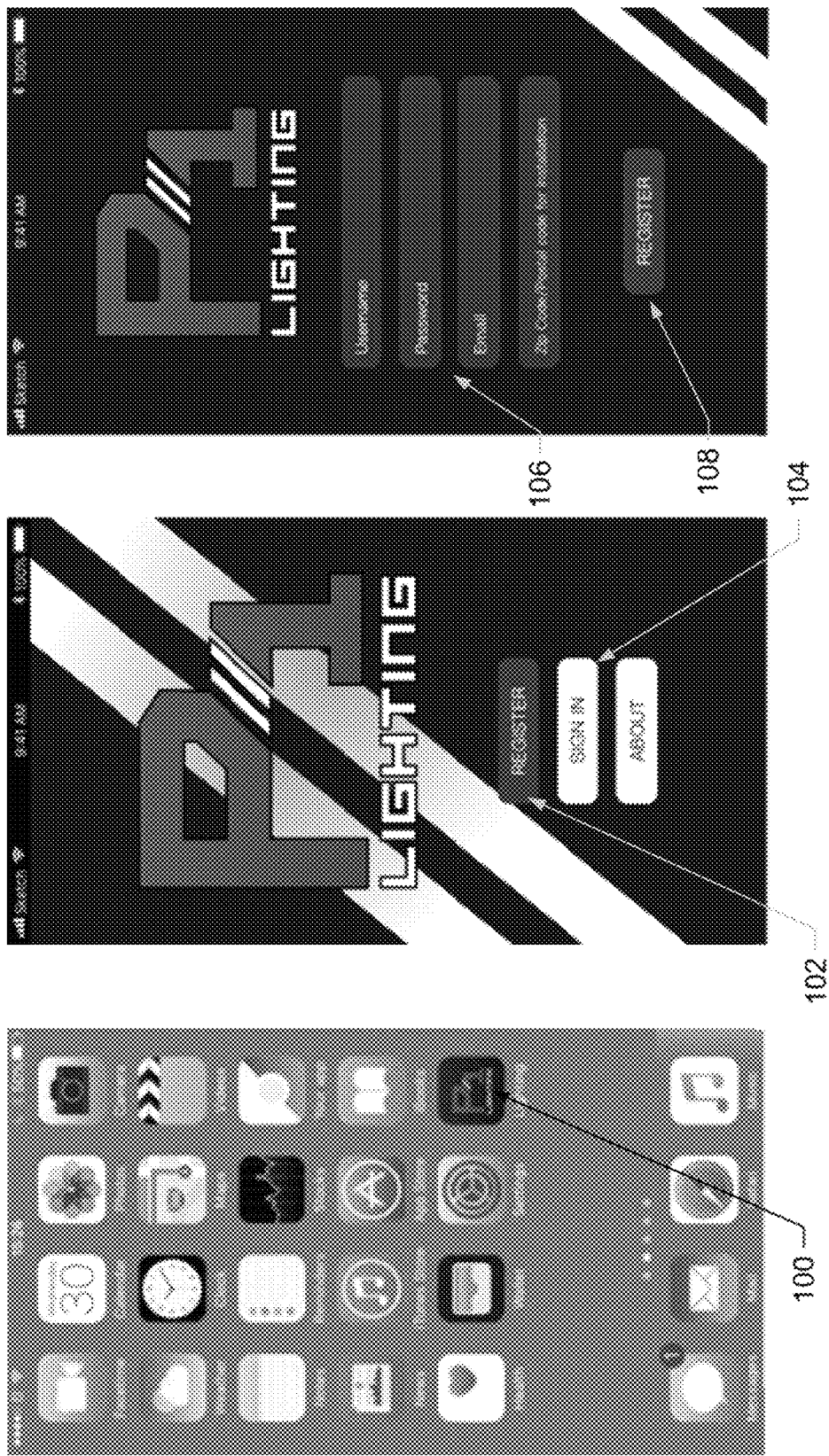

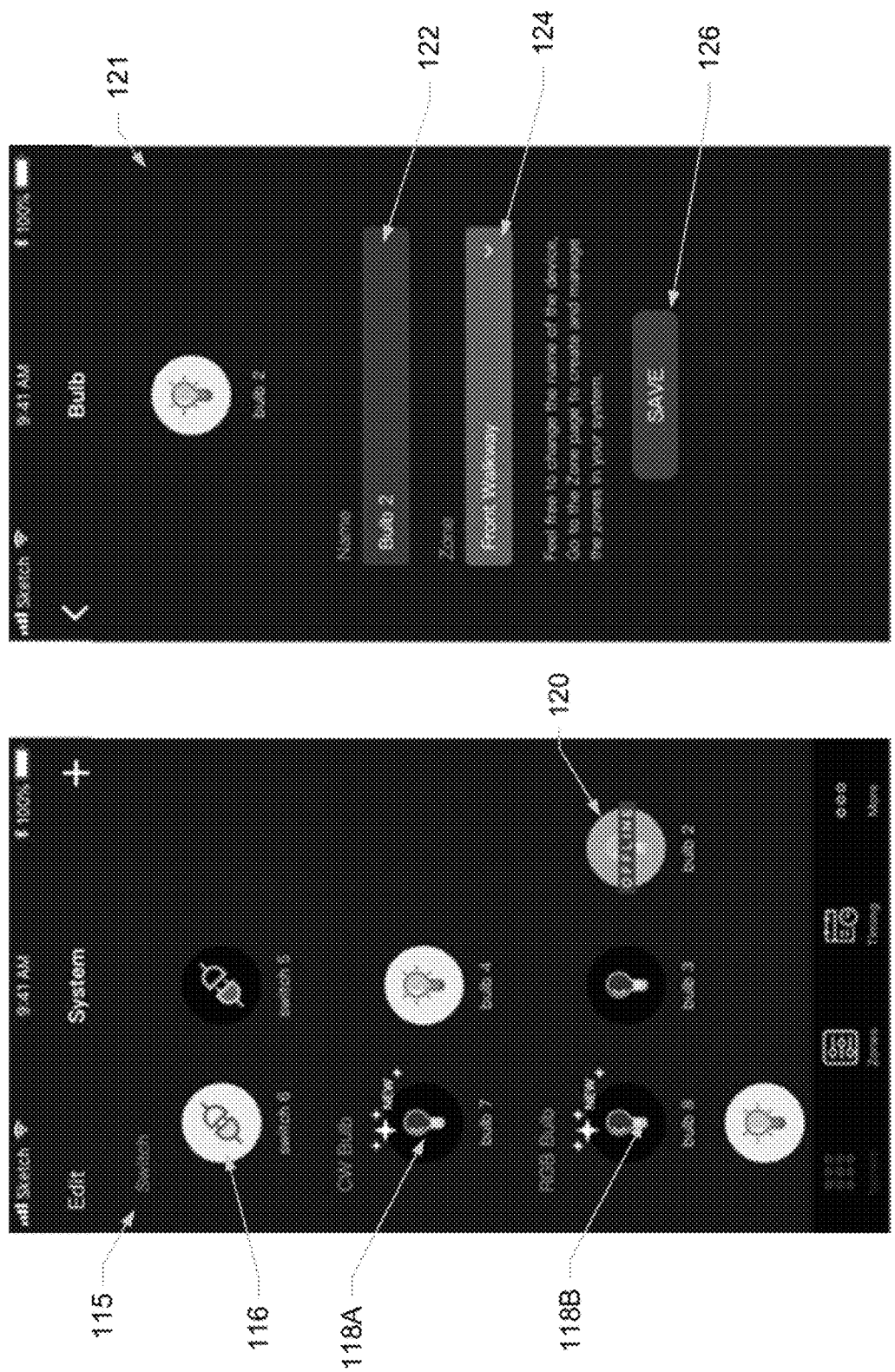

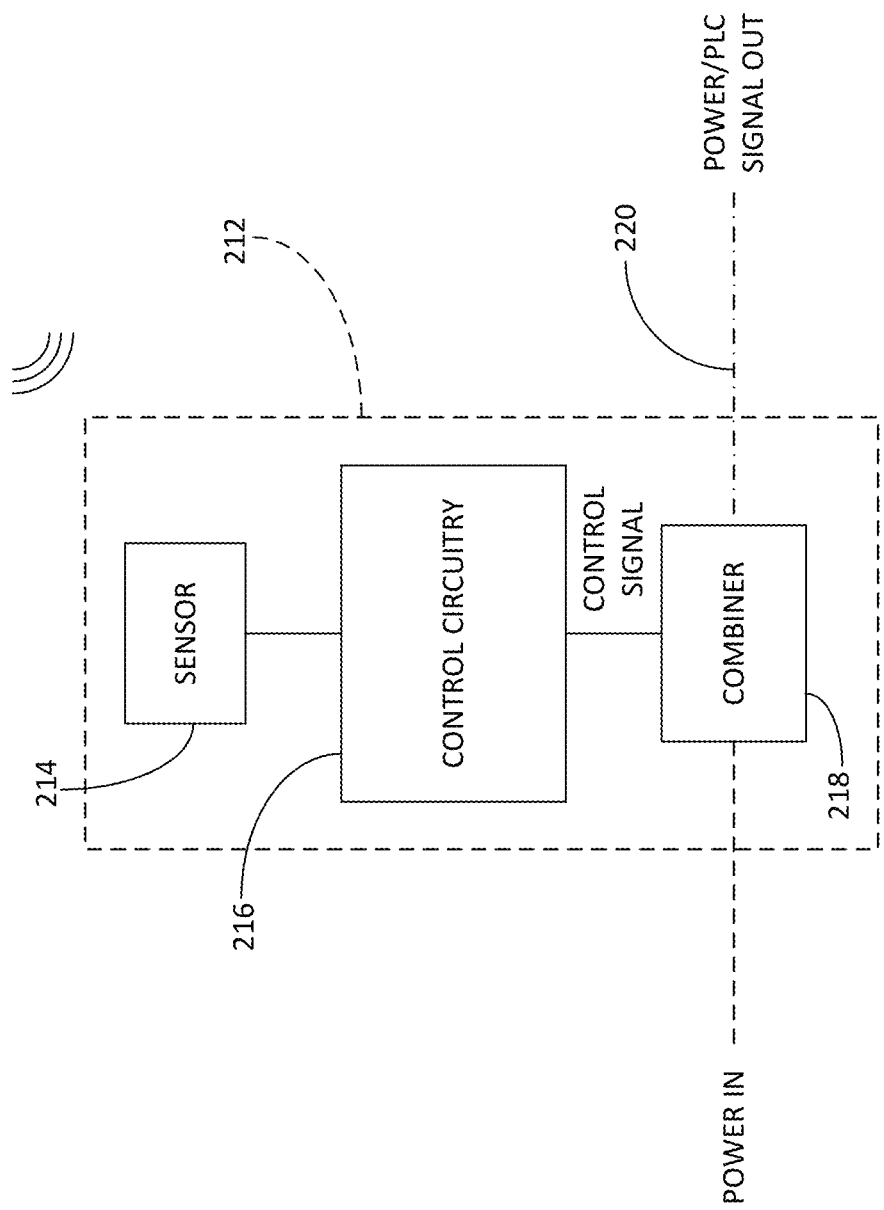

FULLY ADJUSTABLE LANDSCAPE LIGHTING SYSTEM

PRIORITY CLAIM

This application claims priority to U.S. provisional application Ser. No. 62/697,717, filed Jul. 13, 2018, which is incorporated herein by reference in its entirety for all purposes.

FIELD OF THE INVENTION

The present invention relates generally to the art of landscape lighting systems, and more particularly, to a fully adjustable landscape light for use in a landscape lighting system.

BACKGROUND

Outdoor landscape lighting systems are commonly used in both commercial and residential settings for the illumination of structures, walkways, trees, shrubbery, etc. Although there are many reasons for outdoor illumination, the primary purposes are safety and aesthetics. Landscape lighting can facilitate the safety of those on the property by illuminating safe walkways and directing guests to entryways. Lighting can also be useful in pointing out potential obstacles, such as steps or uneven walking surfaces. Landscape lighting can improve the aesthetics of an area by highlighting its attractive features, such as architectural structures, trees, shrubs, and landscape designs.

SUMMARY

Example embodiments of the present invention recognize and address considerations of prior art constructions and methods.

One example embodiment may include a landscape lighting lamp. The landscape lighting lamp may include a lamp housing having at least one retaining feature associated with a light-emitting surface of the lamp housing. The lighting lamp may further include a light source contained in the lamp housing. A plurality of interchangeable optical lenses are configured to be removably coupled to the light-emitting surface of the lamp housing via the at least one retaining feature, where each optical lens of the plurality of interchangeable optical lenses is configured to enable light from the light source to be emitted from the lamp housing at a predefined angle.

A further example embodiment may include a landscape lighting fixture. The landscape lighting fixture may include a fixture body and a landscape lighting lamp. The landscape lighting lamp may include a lamp housing having at least one retaining feature associated with a light-emitting surface of the lamp housing. The lighting fixture may further include control circuitry and a light source operably coupled to the control circuitry. The lighting fixture may further include a plurality of interchangeable optical lenses configured to be removably coupled to the light-emitting surface of the lamp housing via the at least one retaining feature, where each optical lens of the plurality of interchangeable optical lenses is configured to enable light from the light source to be emitted from the lamp housing at a predefined angle.

In another example embodiment, a landscape lighting system is provided including a plurality of landscape lighting fixtures. Each of the landscape lighting fixtures includes a light source, a power supply, control circuitry configured to control the light source and the power supply to emit a predetermined light pattern from the light source based on a control signal, and a communication interface configured to establish a wireless mesh network between the plurality of landscape lighting fixtures, receive one or more control signals from a remote computing device, cause the one or more control signals to be relayed other landscape lighting fixtures of the plurality of landscape lighting fixtures in the mesh network.

An additional aspect of the present invention provides a landscape lighting system comprising a plurality of landscape lighting fixtures, wherein each of the landscape lighting fixtures comprise a light source and circuitry. The circuitry is configured to receive a combined power and control signal over power supply wiring, separate the control signal from a power component of the combined signal, and cause the light source to be controlled based on the control signal.

Those skilled in the art will appreciate the scope of the present invention and realize additional aspects thereof after reading the following detailed description of example embodiments in association with the accompanying drawing figures.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which:

FIG. 3 is a diagrammatic side view of a landscape lighting lamp in accordance with an example embodiment;

FIG. 4A is a diagrammatic top view of a landscape lighting lamp in accordance with a further example embodiment;

FIG. 4B illustrates a cross-sectional representation as taken along line 4B-4B of FIG. 4A showing a lens retaining feature of a landscape lighting lamp in accordance with an example embodiment;

FIG. 8B illustrates a dioramic view of a landscape lighting system in accordance with an example embodiment;

FIGS. 9-22 illustrate a plurality of graphic user interfaces to control operations of the landscape lighting system in accordance with an example embodiment;

FIG. 24 is a diagrammatic representation of circuitry that may be contained in the control module of the embodiment of FIG. 23.

DETAILED DESCRIPTION OF THE PREFERRED EMBODIMENTS

Figure 1:
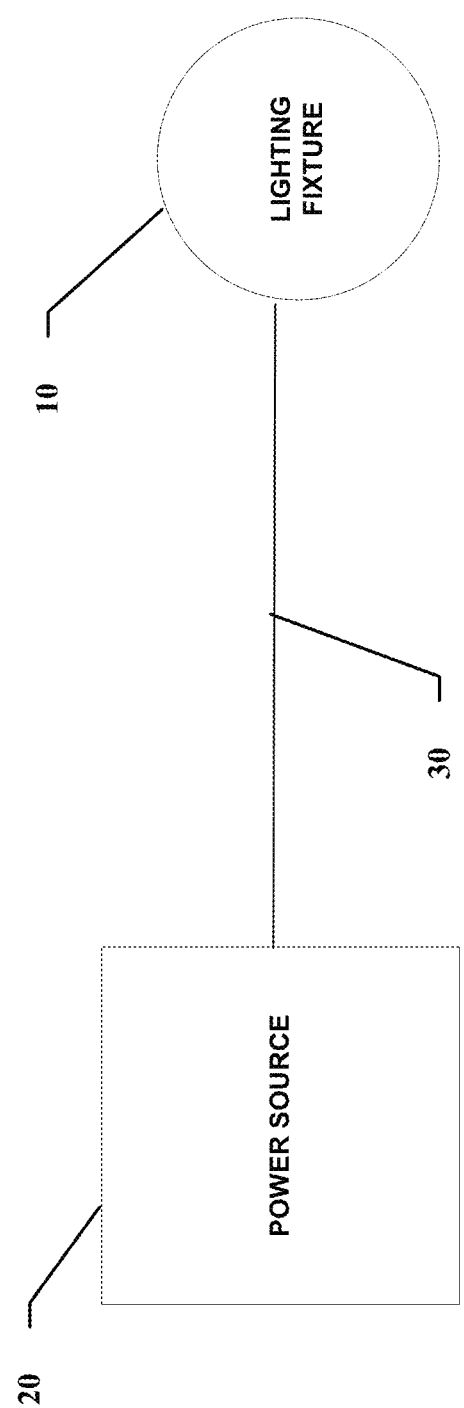
FIG. 1 illustrates a diagrammatic representation of an outdoor landscape lighting system in accordance with an example embodiment.

Reference will now be made in detail to various embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Users may prefer a landscape lighting system that includes a landscape lighting fixture having a landscape lighting lamp that is fully adjustable. For example, the landscape lighting lamp described herein may be configured to have adjustable brightness, color, or beam angle. In some cases, to ensure that the landscape lighting lamp is easy to adjust by the user, it may be adjustable via a remote control (such as a smart phone having a special application, i.e., an "app"). Furthermore, the beam angle of the landscape lighting lamp may be adjustable via a plurality of interchangeable optical lenses that will enable the user to change the beam angle of the emitted light as the user desires by substituting one optical lens for another.

FIG. 1 illustrates an exemplary outdoor landscape lighting system according to some example embodiments. As shown in FIG. 1, the outdoor landscape lighting system may include at least three components: a lighting fixture 10, a power source 20, and electrical wiring 30. It should be understood that the landscape lighting system may typically include more than one lighting fixture 10. For example, multiple lighting fixtures 10 may be connected in parallel directly to the power source 20, or multiple lighting fixtures 10 may be connected to one or more hubs that are connected to the power source 20. An exemplary hub is shown and described in U.S. patent application Ser. No. 15/718,719, filed Sep. 28, 2017 and entitled "Landscape Lighting Junction Hub," incorporated herein by reference in its entirety for all purposes. Furthermore, the one or more lighting fixtures 10 may be respectively placed where desired throughout the outdoor landscape.

In some example embodiments, the power source 20 of the outdoor landscape lighting system may comprise a transformer. The transformer may plug into a standard AC outlet, such as a 120 VAC outlet typically used in North America, and may provide outputs at multiple voltages. For example, a transformer may have AC outputs at 12V, 13V, 14V, and 15V, where the higher voltages are often used to overcome voltage loss from high wattage loads or long cable runs. The transformer may also have control circuitry and be used as a control panel for collectively controlling the lighting fixtures 10 throughout the outdoor landscape. For example, the control panel may include a timer that turns all of the lighting fixtures 10 on or off at specified intervals, or a control for collectively brightening or dimming all the lighting fixtures 10 in the landscape lighting system.

Although the above-described outdoor landscape lighting system is powered through direct electrical wiring, one skilled in the art will appreciate that other means for powering the lighting fixture 10 may be used. For example, the lighting fixture 10 may be solar-powered, relying on solar energy to charge an integrated energy storage device. In this regard, an integrated or standalone solar panel may be electrically connected to a battery located in the lighting fixture 10. The solar panel could charge the battery during the day, and the battery could power the lighting fixture 10 at night.

Figure 2:
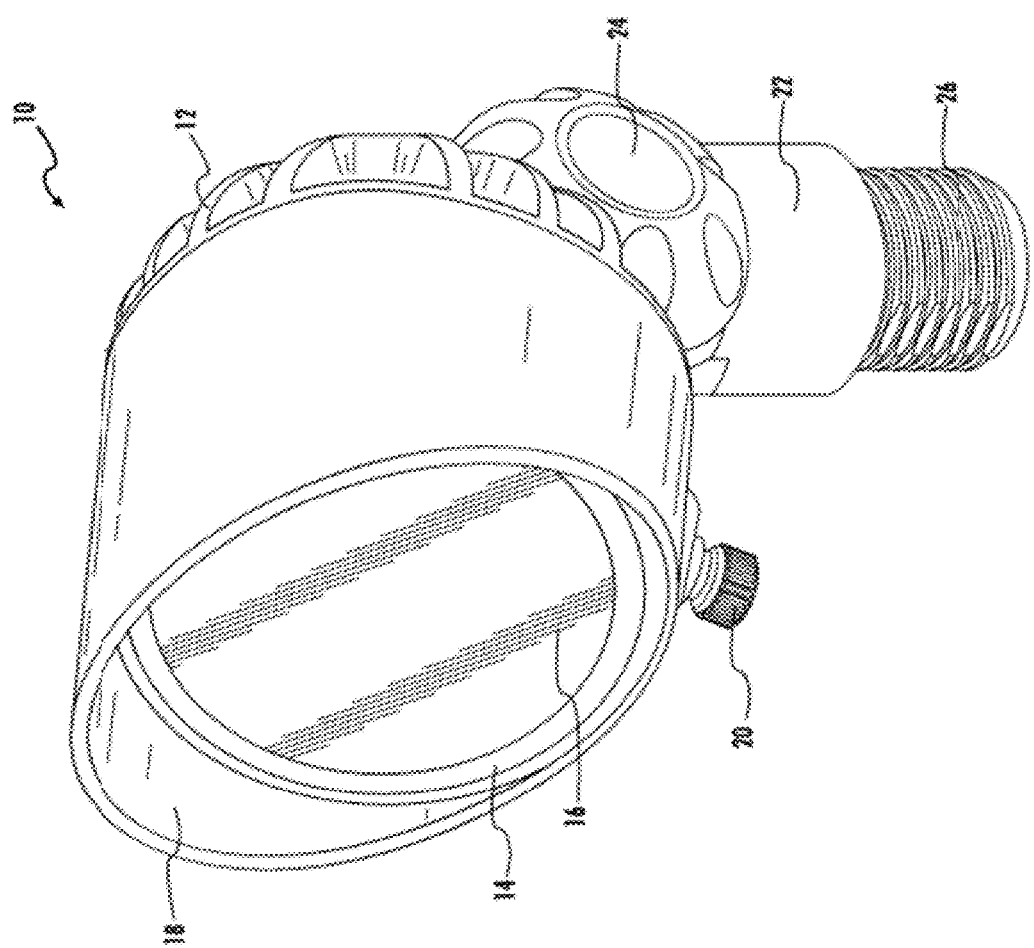
FIG. 2 illustrates a landscape lighting fixture in accordance with an example embodiment.

As discussed above, the landscape lighting system may include a lighting fixture 10. FIG. 2 illustrates an exemplary lighting fixture 10 in the outdoor landscape lighting system according to some example embodiments. As shown, the lighting fixture 10 may include a fixture body 12 for providing a housing for some or all of the internal components of the lighting fixture 10. The fixture body 12 may house and enclose, for example, a lighting lamp 40 (FIG. 3), a mounting structure, electrical socket, etc. The fixture body 12 may further include a guard 14 and a cowl 18. In some cases, for example, the guard 14 may have internal threads which mate with external threads on the fixture body 12 resulting in a landscape lighting fixture 10 that may then be watertight and ready to be installed for outdoor use. Furthermore, the cowl 18 may be placed over the guard 14 for directing light and may be secured in place by a retention screw 20.

The fixture body 12 may be pivotally connected to a base extension 22 by a swivel 24. In this regard, the fixture body 12 may be rotated about the axis of the swivel 24, thus allowing the lighting fixture 10 to be pivoted to a selected position between, for example, a horizontal orientation and a vertical orientation. The distal end of the base extension 22 may have a threaded portion 26 which may be used to connect the lighting fixture 10 to a fixture base or any suitable support structure (such as a stake) for installation in the outdoor landscape. In other example embodiments, however, the lighting fixture 10 may not include a threaded portion 26, but rather the base extension 22 may be integrally formed with a stake or other mounting mechanism for installing the lighting fixture 10 in the outdoor landscape.

As discussed above, the lighting fixture 10 may directly or indirectly receive power by electrical wiring 30 from the power source 20. In this regard, the fixture base (or other mounting structure), base extension 22, and/or swivel 24 may be hollow to provide a path for feeding the electrical wiring 30 into the fixture body 12. Furthermore, the electrical wiring 30 may then be operably coupled to the lamp socket housed in the fixture body 12 directly or via intervening control circuitry. As further discussed below, the lamp socket may be configured such that the lighting lamp 40 may be slidably inserted to receive power and slidably removed for replacement.

In some cases, the fixture body 12 and the guard 14 may be constructed of steel, plastic, or other suitable rigid or semi-rigid material sufficient to house and support the lighting lamp 40 and any other components housed therein. A protective lens 16 may cover or sit within the guard 14 to protect the components housed within the fixture body 12. For example, the protective lens 16 may be fixed in the guard 14 such as by placing a bead of adhesive around a surface of the protective lens 16 and securing the protective lens 16 to a mating surface inside the guard 14. The protective lens 16 may be formed from plastic, glass, or any other suitably rigid material that is light transmissive.

As discussed above, the lighting fixture 10 may include a lighting lamp 40. Referring now to FIGS. 3 and 4A, the lighting lamp 40 may include a lamp housing 42, a light source 50, a plurality of optical lenses 52 (see FIGS. 5A and 5B) and electrical contacts 46. A control board 60 (see FIG. 6) configured to operate or control the lighting lamp 40 may be incorporated into lamp housing 42 or may be external to lamp housing 42 within fixture body 12. In some cases, the lighting lamp 40 may be configured to operate nominally at 12 VAC, but the input voltage may vary from 6 VAC to 18 VAC. Furthermore, the lighting lamp 40 may be placed inside the fixture body 12 such that the electrical contacts 46 may be inserted or operably coupled into the lamp socket of the lighting fixture 10. In some example embodiments, the electrical contacts 46 may be spaced apart metal pins that extend outward from the lamp housing 42 as shown in FIG. 3. It should be understood, however, that other types of suitable electrical contacts may also be used.

The light source 50 may comprise one or more light-emitting diodes 54 ("LEDs") situated in the bowl portion 55 of lamp housing 42. As one skilled in the art will appreciate, the bowl portion 55 of lamp housing 42 will preferably include a highly reflective inside surface to direct light from the light source 50 toward the open end of bowl portion 55 which is opposite contacts 46. In the illustrated embodiment shown in FIG. 4A, for example, the lighting lamp 40 comprises two LEDs 54. In accordance with other example embodiments, however, the light source 50 may comprise any suitable number of LEDs 54 or other appropriate light bulbs or the like.

In some cases, each of the LEDs 54 may be configured to have a distinct color temperature. For example, a first one of the LEDs 54 may be configured to have a color temperature ranging from approximately 1500-2500 Kelvin ("K"). In other example embodiments, the first one of the LEDs 54 may be configured to have a color temperature ranging from approximately 1500-2000K. In even further example embodiments, the first one of the LEDs 54 may be configured to have a color temperature of approximately 2000K. A second of the LEDs 54 may be configured to have a color temperature of approximately 3500-4500K. In other example embodiments, the second of the LEDs 54 may be configured to have a color temperature of approximately 3500-4000K. In further example embodiments, the second of the LEDs 54 may be configured to have color temperature of approximately 4000K.

Additionally or alternatively, the light source 50 may include three LEDs 54 of different colors. For example, the LEDs 54, may include a blue LED, a red LED, and green LED, which may be commonly referred to as RGB LEDs. The control circuitry may independently adjust each of the three RGB LEDs to produce a wide range of colors. In some example embodiments, the color emitted from the RGB LEDs may also be mixed to form white light. In some embodiments, the RGB LEDs may be red, green, and blue elements of one or more multicolored LEDs.

Figure 6:
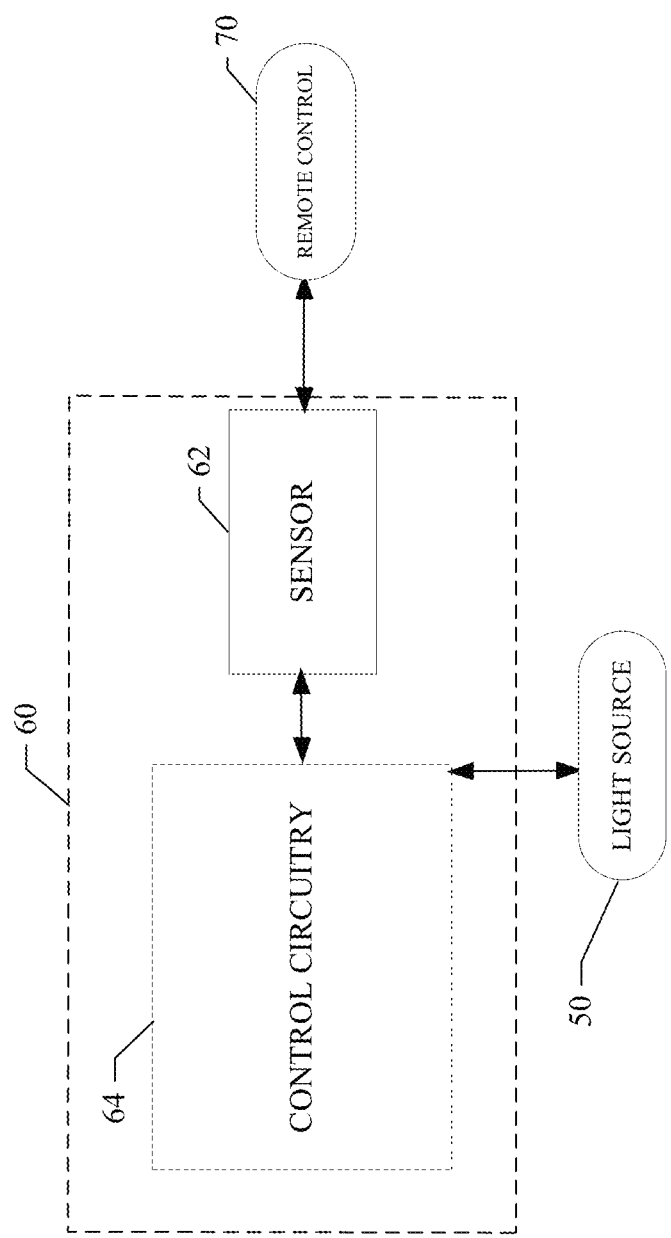
FIG. 6 illustrates control circuitry in the form of a control board of a landscape lighting fixture in accordance with an example embodiment.
Figure 7:
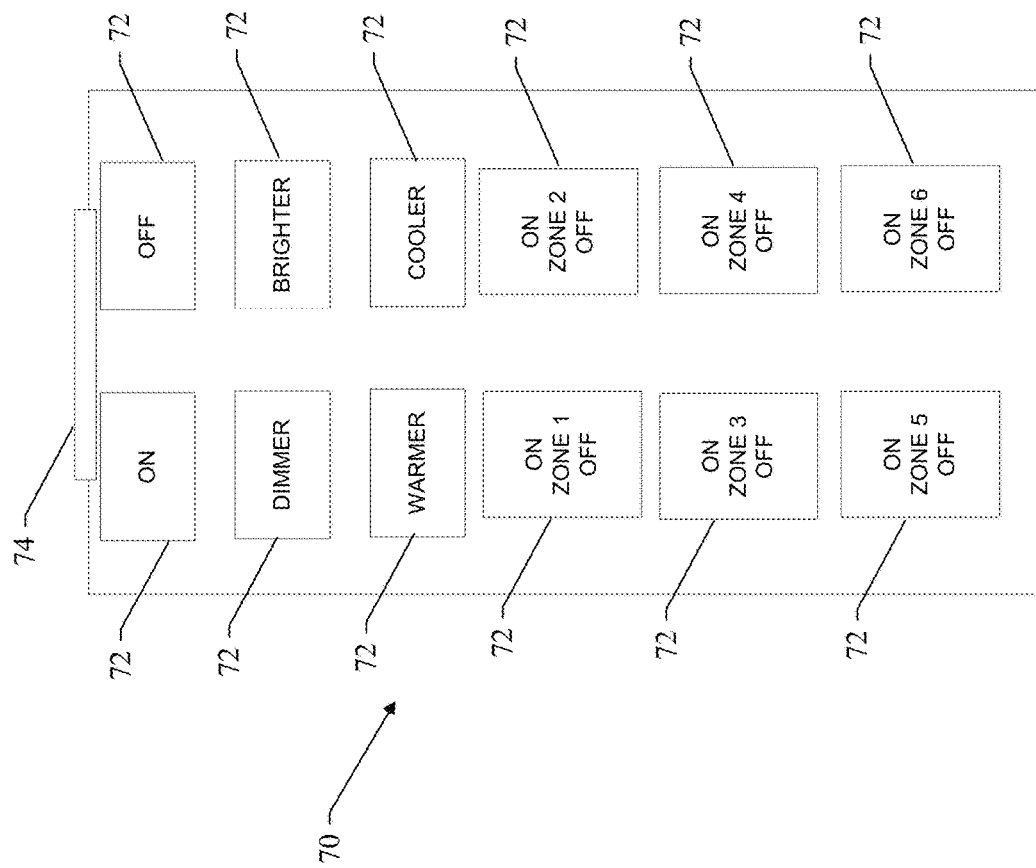
FIG. 7 illustrates a remote control device for use with a landscape lighting fixture in accordance with an example embodiment.

In some example embodiments, the LEDs 54 may be operably coupled to the control board 60, as further discussed below in conjunction with FIG. 6. The control board 60 may be configured such that each of the LEDs 54 may operate at full power (e.g., 2000K or 4000K), or in some cases, be adjustable such that a user may tune the color to any ratio that is proportional between the plurality of LEDs 54. Furthermore, the LEDs 54 may be configured to be controllable or adjustable by a remote control 70 (FIG. 7). For example, each of the LEDs 54 may be turned on or off, may be brightened or dimmed, or may be otherwise adjusted, in response to a wireless signal received by a sensor 62 of the control board 60. The wireless signal emitted by the remote control 70 may be an optical (e.g., infrared) signal, a radio (e.g., Bluetooth) signal, or the like. For example, the remote control 70 may be embodied as an app on a smart phone. In an example embodiment discussed below in reference to FIGS. 8A-22, the wireless signal may be Bluetooth mesh network signal that may be distributed throughout the landscape lighting system. Alternatively, as explained more fully below, a control signal may be provided to the lighting fixtures over a hard-wired connection, e.g., a power line communication (PLC) signal received over the wiring that supplies power to the light source. In this case, the remote control 70 may communicate with a control module that in turn controls the various fixtures using PLC control signals.

As shown in FIGS. 3 and 4A, the landscape lighting lamp 40 may also include a protective cap 44 that may be operably coupled to the open end of bowl portion 55 of the lamp body 42. In this regard, the protective cap 44 is preferably formed from plastic, glass, or any other suitably rigid and transparent material to provide a light-transmissive surface of the lamp body 42. As a result of the configuration of lamp body 42, the light source 50 of the landscape lighting lamp 40 is configured to emit light in a direction opposite from the electrical contacts 46 towards and through the lighting emitting surface. It will be appreciated that the protective cap 44 will protect the components housed inside of the lamp body 42.

As one skilled in the art will appreciate, the positioning of the sensor 62 will depend on the type of control signal that is used. For example, an infrared control signal generally requires a line of sight to the sensor through material that is transparent to infrared signals. In this case, for example, the sensor may be mounted in lamp housing 40 so that the infrared control signal can pass through lens 16 and cap 44. Alternatively, a transparent window may be provided on the side of fixture body 12. In the case of a radio signal, line of sight considerations may not arise, but components of lighting fixture 10 and lighting lamp 40 will need to be transparent to radio signals at the frequencies of interest so that the control signal can be received by sensor 60.

Referring now to FIGS. 4A and 4B, protective cap 44 may have one or more integral retaining features for connecting a selected one of interchangeable lenses 52 with lighting lamp 40 to alter its optical characteristics. In a preferred embodiment, the retaining feature(s) comprise a plurality of arcuate tabs 48 (e.g., three tabs) spaced apart around the periphery of protective cap 44 and adjacent to the light-emitting surface thereof. The tabs 48 are configured such that a selected one of the plurality of interchangeable optical lenses 52 may be operably coupled to the light-emitting surface of the lamp housing 42. In other words, the tabs 48 enable the user to replace or switch out the optical lenses 52 as the user desires. In this embodiment, the tabs 48 are arc-shaped as shown. It will be appreciated, however, that the tabs 48 may be configured to have any suitable length, width, or shape in order to secure an optical lens 52 to the lighting lamp 40. Moreover, other types of retaining features may be used to removably couple the respective optical lens 52 to the housing 42. For example, each of the optical lenses 52 may be configured to removably attach directly onto the light-emitting surface of the lamp housing 42 such as via a weak adhesive.

FIG. 4B illustrates a cross-sectional representation of a tab 48 of the landscape lighting lamp 40 in accordance with an example embodiment. As shown, each of the tabs 48 may include a vertical portion 48a and a horizontal portion 48b. In order to enable the user to easily replace or switch out the optical lenses 52, the periphery of an optical lens 52 may be received between the protective cap 44 and the horizontal portion 48b of the tab 48. Because the lenses 52 are in this case formed of a flexible material, they may be easily bent by the user for insertion into the tabs 48. Due to the material's memory characteristics, the lens 52 will resume its flat shape when released so as to be retained in tabs 48. It should thus be understood that the tabs 48 not only allow for ease of switching between optical lenses 52 but also effectively secure the selected optical lens 52 to the lighting lamp 40.

Figure 5A:
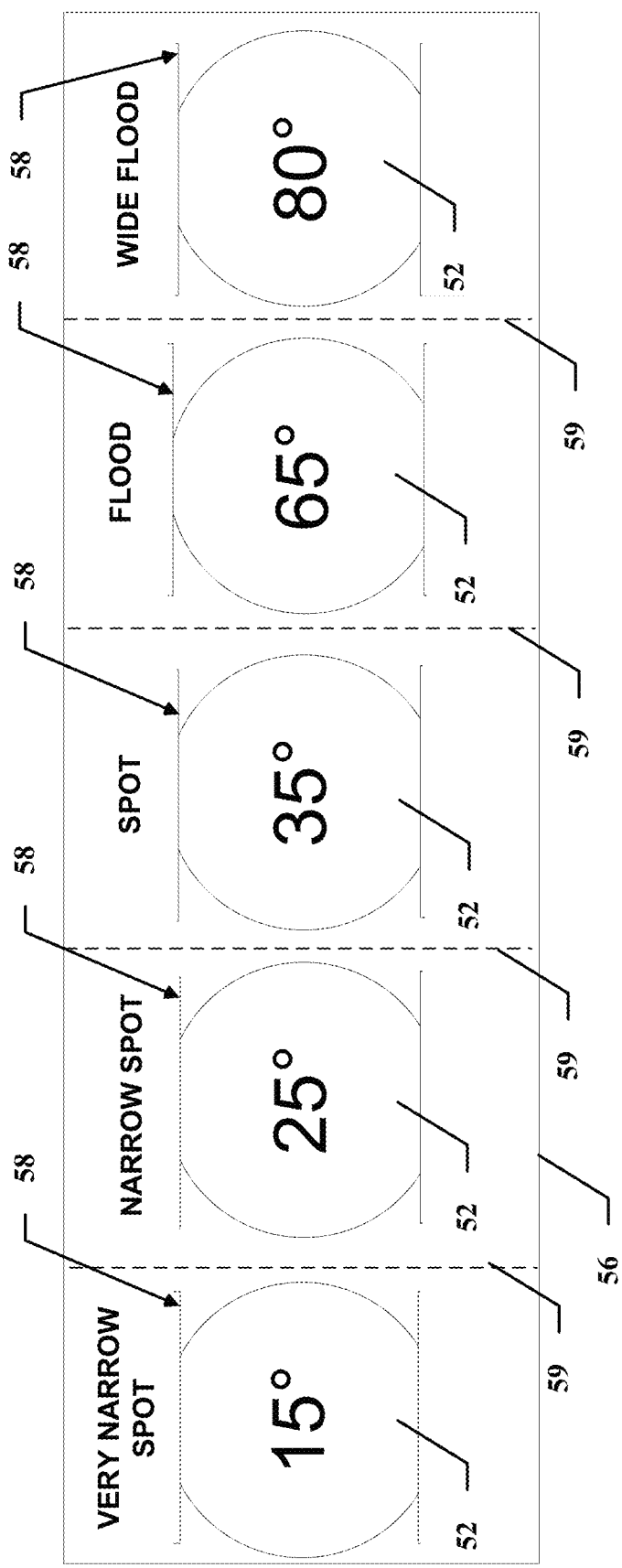
FIGS. 5A and 5B illustrate a carrier holding a plurality of interchangeable optical lenses in accordance with an example embodiment.
Figure 5B:
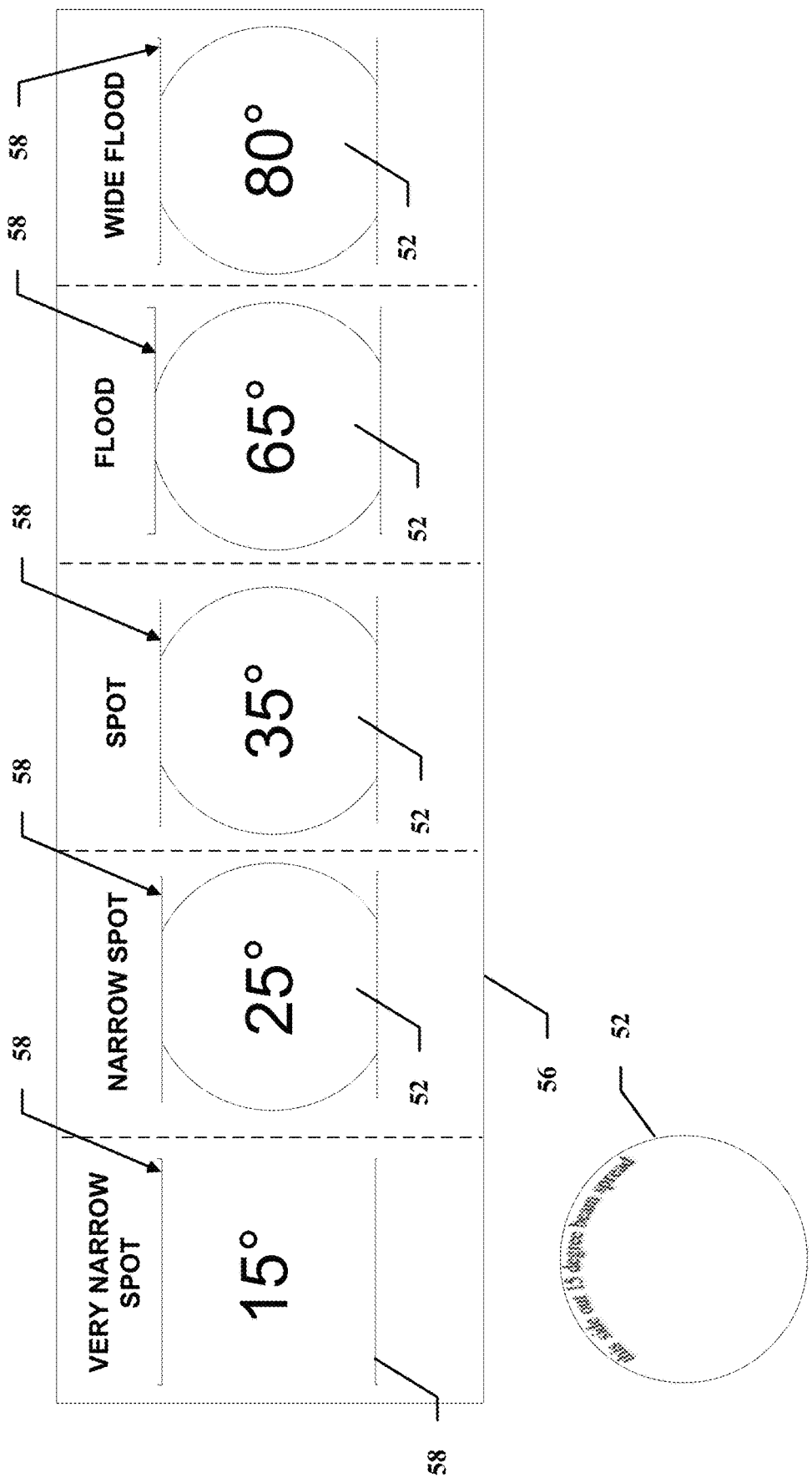

FIGS. 5A and 5B illustrate the plurality of interchangeable optical lenses 52 and a carrier 56 for managing the plurality of interchangeable optical lenses 52 in accordance with an example embodiment. As shown, each of the plurality of interchangeable optical lenses 52 may be configured to direct a light beam at a different predefined angle. In other words, the light source 50 emits the light beam, and the interchangeable lens 52 removably coupled to the lamp housing 42 emits the light beam from the lamp housing 42 at a predefined angle that is different from the other lens 52. In accordance with an example embodiment, the optical lens 52 may each be configured to adjust the beam angle of the light emitted from the light source 50 to a predefined angle between 5-95°.

For example, a first one of the plurality of optical lenses 52 may be configured to adjust the beam angle to about 5-15°. In other cases, the first one of the plurality of optical lenses 52 may be configured to adjust the beam angle to about 15°. A second one of the plurality of optical lenses 52 may be configured to adjust the beam angle to about 16-25°. In other cases, the second one of the plurality of optical lenses may be configured to adjust the beam angle to about 25°. A third one of the plurality of optical lenses 52 may be configured to adjust the beam angle to about 26-45°. In other cases, the third one of the plurality of optical lenses may be configured to adjust the beam angle to about 35°. A fourth one of the plurality of optical lenses 52 may be configured to adjust the beam angle to about 46-65°. In other cases, the fourth one of the plurality of optical lenses may be configured to adjust the beam angle to about 65°. A fifth one of the plurality of optical lenses 52 may be configured to adjust the beam angle to about 66-95°. In other cases, the fifth one of the plurality of optical lenses may be configured to adjust the beam angle to about 80°. While the example embodiment illustrates five optical lenses 52, it should be understood that more or less optical lens may be included, and each lens may be configured to have a different predefined angle falling in a range of between approximately 5 degrees to 95 degrees.

In accordance with example embodiments, the predefined beam angle is produced by a specific pattern or etching disposed on a surface of the lens 52. As shown in FIG. 5B (on the optical lens 52 removed from the carrier 56), each of the optical lens 52 may include indicia to indicate which side of the optical lens 52 should be facing out when inserted into the tabs 48. The indicia may be located directly on the optical lens 52 near an edge of the optical lens 52 to not interfere with light transmission therethrough.

As further shown in FIGS. 5A and 5B, the carrier 56 may be used to hold the plurality of interchangeable optical lenses 52 when the optical lenses 52 are not being used on the landscape lighting lamp 40. For example, the carrier 56 may have a plurality of lens placement locations each having a respective pair of opposed slots 58. A fold line 59 may be formed between adjacent lens placement locations in order to allow the carrier 56 to be folded accordion-like into a more compact size. The carrier 56 may be formed of coated or uncoated paper, semi-rigid plastic sheet, or other suitable material.

As noted, each opposed pair of slots 58 is configured in this embodiment to hold one of the plurality of optical lenses 52. Furthermore, carrier 56 may include indicia between each such pair of slots 58 indicating which optical lens 52 is intended to be stored at that location. For example, the indicia may indicate the predefined angle at which the optical lens 52 is configured to emit light. It should be understood that the indicia may be printed directly onto the surface of the carrier 56 and seen through the stored optical lens so that the user can clearly associate the optical lens 52 with the corresponding pair of slots 58. For example, as shown in FIG. 5B, even if the optical lens 52 that has the predefined angle of 15° is removed from the carrier 56, the carrier 56 includes indicia (e.g., a label or printing) to indicate that the optical lens having the predefined angle of 15° is intended to be placed back into that location when not in use.

Furthermore, each lens location of the carrier 56 may include further indicia to indicate a setting or parameter associated the predefined angle. For example, the location intended to hold the optical lens 52 having a beam angle of 15° may include indicia to indicate that the beam angle is associated with illuminating a very narrow spot. The location intended to hold the optical lens 52 having a beam angle of 25° may include indicia to indicate that the beam angle is associated with narrow spot illumination. The location intended to hold the optical lens 52 having a beam angle of 35° may include indicia to indicate that the beam angle is associated with spot illumination. The location intended to hold the optical lens 52 having a beam angle of 65° may include indicia to indicate that the beam angle is associated with flood light illumination. The location intended to hold the optical lens 52 having a beam angle of 80° may include indicia to indicate that the beam angle is associated with wide flood illumination. It should be understood that the carrier 56 may be configured to have any number of lens locations (e.g., defined by opposing pairs of slots 58) depending on the number of interchangeable optical lenses 52 included.

In accordance with some example embodiments, the lighting fixture 12 may include a control board 60. FIG. 6 illustrates an exemplary control board that may be embodied or housed within the lighting fixture 12 (including within or as part of lighting lamp 40). The control board 60 may include the electronics for operating the lighting lamp 40. In this regard, the control board 60 may include a sensor 62 for receiving an optical (e.g., infrared) control signal or a radio (e.g., Bluetooth) control signal from the remote control 70. Alternatively, the sensor may comprise a suitable filter or multiplexer for extracting a PLC control signal from power supply wiring. The sensor 62 may be in the form of a chip mounted to the surface of the control board 60 which is appropriately situated in a location to receive its control signal. The control board 60 may also include control circuitry 64 that is in electrical communication with the light source 50 and the sensor 62 that controls power to and operation of the lighting lamp 40 as described herein. Furthermore, in other example embodiments, the control board 60 may contain power supply circuitry that converts AC voltage from the power supply 20 to a DC voltage suitable for the light source 50 (and operation of the circuitry itself).

In the illustrated embodiment, the control board 60 includes the control circuitry 64 and the sensor 62 as separate components interconnected on a printed circuit board (PCB). However, this configuration is included for the purposes of explanation, and is not meant to be limiting. One skilled in the art will appreciate that there are other means for establishing electrical communication between the various system components. For example, the control board 60 may be a series of interconnected printed circuit boards, an integrated circuit, or may be physically embodied in any other suitable manner. Moreover, the control board 60 may be a collection of discrete electronic components mounted within the lamp housing 42 or a combination of IC chips and discrete components.

As mentioned above, the lighting lamp 40 may be controlled by a suitable wireless remote control 70. FIG. 7 illustrates an exemplary remote control that be used to remotely control the lighting lamp 40. According to one preferred embodiment, the remote control 70 may be a small handheld device having a plurality of tactile or virtual buttons 72 corresponding to different functions. For example, one of the plurality of buttons 72 may correspond to "off", and another one or more of the plurality of buttons 72 may correspond to a lighting intensity level. Furthermore, when the landscape lighting system includes a plurality of landscape lighting fixtures 10, the remote control 70 may include a button 72 corresponding to each of the landscape lighting fixtures 10 in the landscape lighting system. Thus, it will be appreciated that the remote control 70 preferably allows for independent control of each landscape lighting fixture 10 in the landscape lighting system, without concern that other landscape lighting fixtures will be inadvertently controlled at the same time. In some cases, the user can turn each landscape lighting fixture 10 on or off independently, or adjust the lighting through fixed lighting increments with the push of a corresponding button (e.g., button 72). For example, the user can use the remote to set the lighting intensity at 10%, 20%, 40%, or 80% of the full lighting. Moreover, the landscape lighting fixtures 10 may be grouped in zones. Thus, a landscape lighting system may include one zone or a plurality of zones. In accordance with an example embodiment, at one or more locations on the remote control 70 is an emitter 74 which is used to broadcast a control signal in accordance with operator input.

Figure 8A:
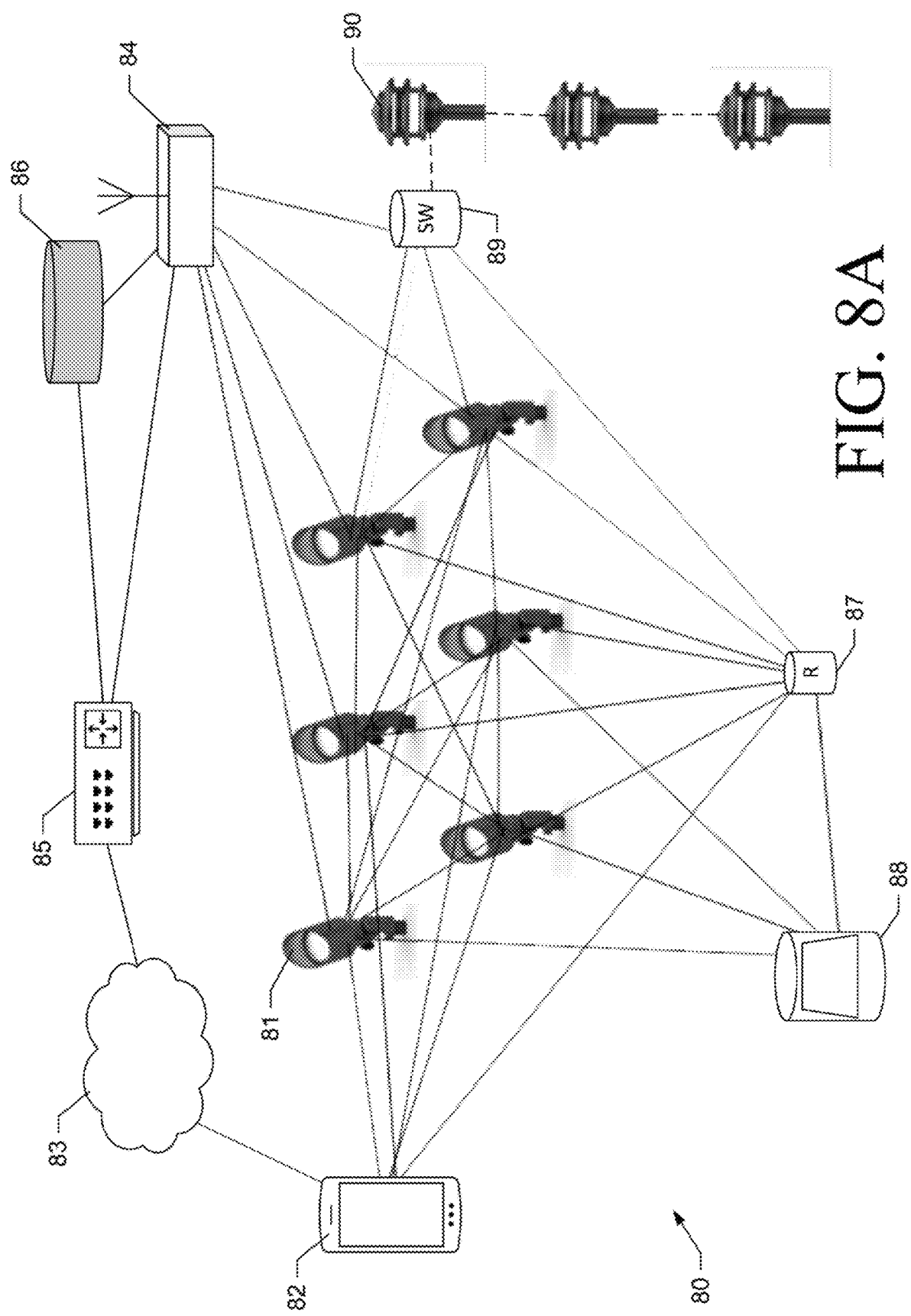
FIG. 8A illustrates a schematic view a landscape lighting system in accordance with an example embodiment.

Turning to FIGS. 8A and 8B, a landscape lighting system 80 is provided that is configured communicate control signals throughout the landscaping lighting system 80 through a mesh network. FIG. 8A depicts a communication schematic of the landscape lighting system and FIG. 8B depicts an example physical layout of the landscape lighting system. A plurality of lighting fixtures 81, which may be substantially similar to the lighting fixtures 10 discussed above, may be disposed about a property, such as around a home or building 91. Each of the landscape lighting fixtures 81 may include a communication interface configured to establish a mesh network between the landscape lighting fixtures. In an example embodiment, the communication interface, e.g. sensor 62 (FIG. 6), may be a Bluetooth antenna configured for Bluetooth mesh networking. The landscape lighting fixtures 81 may establish a mesh network connection with multiple other landscape lighting fixtures 81 and/or other landscape lighting system components, as discussed below.

One or more of the landscape lighting fixtures 81 may receive a control signal from a remote control 70 (FIG. 7) and/or a remote computing device 82, such as a smart phone, personal data assistant, laptop computer, tablet computer, smart watch, or the like. The control signal may be passed throughout the mesh network by the landscape lighting fixtures 81. Each of the landscape lighting device may be configured to transmit any received control signal to each of the landscape lighting devices to which it is connected, such that the control signal spreads along the mesh network regardless of the particular landscape light fixture for with the control signal is addressed.

In some example embodiments, one or more landscape lighting fixtures 81 may be disposed at a location that is out of the range of the communication interface of the next closest landscape lighting fixture. Additionally or alternatively, one or more landscape lighting fixture 81 mesh network communication may be obstructed, such as by the building 91. In such an instance, a repeater 87 (R) may be disposed at a location between two or more landscaping lighting fixtures 81. The repeater 87 may establish communication with the mesh network and relay control signals between landscape lighting fixtures 81. The repeater 87 may increase the effective range of at least a portion of the landscape lighting system 80.

In some example embodiments, the landscape lighting system 80 may include a connection to the internet 83 and/or a local area network. In such an embodiment, the landscape lighting system 80 may include a communication gateway configured to provide a communication path between the internet and/or local area network to the mesh network. For example, the communication gateway 84 may be in data communication with a router 85, which is in turn in data communication with an internet service provider and/or a local area network. The communication gateway 84 may receive command signals in an internet protocol from an internet connection and/or the local area network via a WiFi or Ethernet connection. The communication gateway 84 may then transmit the command signal to one or more components in the mesh network, such as one or more of the landscape lighting fixtures 81, the repeater 87, or the like. In an example embodiment, a user may generate a command signal using the remote computing device 82 at a remote location, e.g. a location at which the remote computing device 82 cannot establish communication with the mesh network. The remote computing device 82 may transmit the command signal using a cellular protocol to a server connected to the internet 83, which may, in turn, transmit the command signal using an internet protocol to the router 85, such as through a modem. The router 85 then sends the command signal to the communication gateway 84 to be transmitted to the mesh network.

In an example embodiment, the local area network may be in data communication with one or more voice control devices 86, such as devices that include Alexa, Siri, Google Assistant, or the similar voice recognition software. The voice control device may generate a command signal based on a user voice input, which may be transmitted to the router 85 through the local area network. The router 85 may then send the command signal to the communication gateway 84 to be transmitted to the mesh network. Alternatively, the voice control device 86 may establish communication with the mesh network directly, such as in an instance in which the voice control device 86 is Bluetooth enabled. In such an example, the voice control device 86 may transmit the command signal directly to one or more components in the mesh network, such as the communication gateway 84.

In some example embodiments, the landscape lighting system 80 may include legacy landscape lighting fixtures 90. In the depicted example, the legacy landscape lighting fixtures 91 are preexisting lighting for a sidewalk 92. The legacy landscape lighting fixtures 90 may include a wired power supply (depicted by dashed lines) that is conventionally connected to a transformer that is switched on and off to control the legacy landscape lighting fixtures 90. In an embodiment that includes one or more legacy landscape lighting fixtures 90, the transformer may be replaced with a lighting control relay 89, e.g. switch (SW), or the lighting control relay 82 could be electrically connected between the transformer and the legacy landscape lighting fixtures 90.

In some embodiments, the lighting control relay 89 may include control circuitry substantially similar to the control circuitry 60 (FIG. 6) of the landscape lighting fixtures 81. The lighting control relay 89 may be configured to establish communication with the mesh network and receive one or more control signals in a manner similar to the mesh network components discussed above, including, but not limited, to transmitting the received control signals to other components in the mesh network. The lighting control relay 89 may cause the legacy landscape lighting fixtures 90 to turn on, turn off, change intensity, change color temperature, change color or color pattern, or other suitable lighting action, in response to one or more control signals. In many cases, however, it will be appreciated that the legacy landscape lighting fixtures 90 may be non-smart ("dumb") devices that merely turn on and off. Such fixtures can be switched individually or only in groups depending on the configuration of relay 89 and how it is wired to the respective fixtures 90.

In an example embodiment, the mesh network may also be in data communication with one or more security devices 88, including but not limited to infrared motion detectors, window sensors, door sensors, a security system, or the like. The security device 88 may be configured to generate a control signal, such as turn on all landscape lighting fixtures in response to the security device 88 detecting a security breach, such as movement, opening a window, opening a door, breaking glass, or the like. Similar, to the voice control device 86, discussed above, the security device may transmit the command signal to the mesh network through a data connection to the local area network, the router 85, and/or the communication gateway 84. Additionally or alternatively, the security device 88 may establish communication with the mesh network and transmit the command message to one or more components in the mesh network.

FIGS. 9-22 illustrate various graphic user interfaces and interface features that may be utilized by the remote 70 and/or the remote computing device 82. A landscape lighting control application may be downloaded and installed on a smart phone or other computing device 82. The application may then be initiated by the user by selecting the application icon 100, as depicted in FIG. 9, or by otherwise opening the application on the computing device, such as using a file directory, dropdown menus, or the like.

As depicted in FIG. 10, the user may select one or more log in options. If the user has not created an account with a remote server, the user may select the "register" virtual button 102 and register using the registration user interface, as discussed in FIG. 11. If the user has previously registered, the user may select the "sign in" virtual button 104 and enter identification data, as discussed in FIG. 12.

FIG. 11 depicts a registration user interface, in which the user may enter registration data into one or more data fields 106. The data fields may include a username, account password, email address, location, or other useful user data. The user name and password may be utilized by the server to identify and authenticate the account and user during subsequent log ins. The email address may be used to correspond with the user about system or component software updates, provide advertisements regarding landscape lighting system components, or the like. The location may include a zip code associated with the installation location of the landscape lighting system 80, which may be utilized to determine a dawn or dusk time for the location. Additionally or alternatively, the application may determine location information based on global positioning data from the computing device 82, a location associated with the modem or IP address, or any other suitable location determination method. The registration data may be saved in a memory at the server for subsequent log in and application usage.

Figure 12:
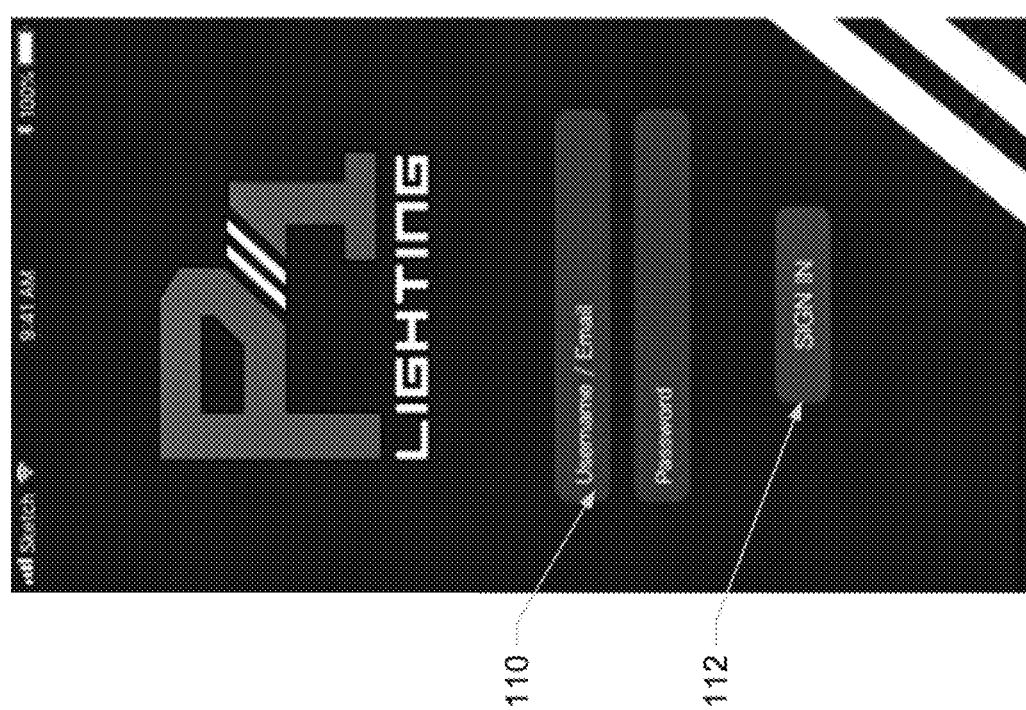

FIG. 12 depicts a sign in user interface for users that have previously registered. The user may enter identification data in one or more data fields 110, such as a user name and password. The user may then cause the identification information to be transmitted to the server for verification with the stored registration information by selecting the "sign in" virtual button 112.

Figure 13:
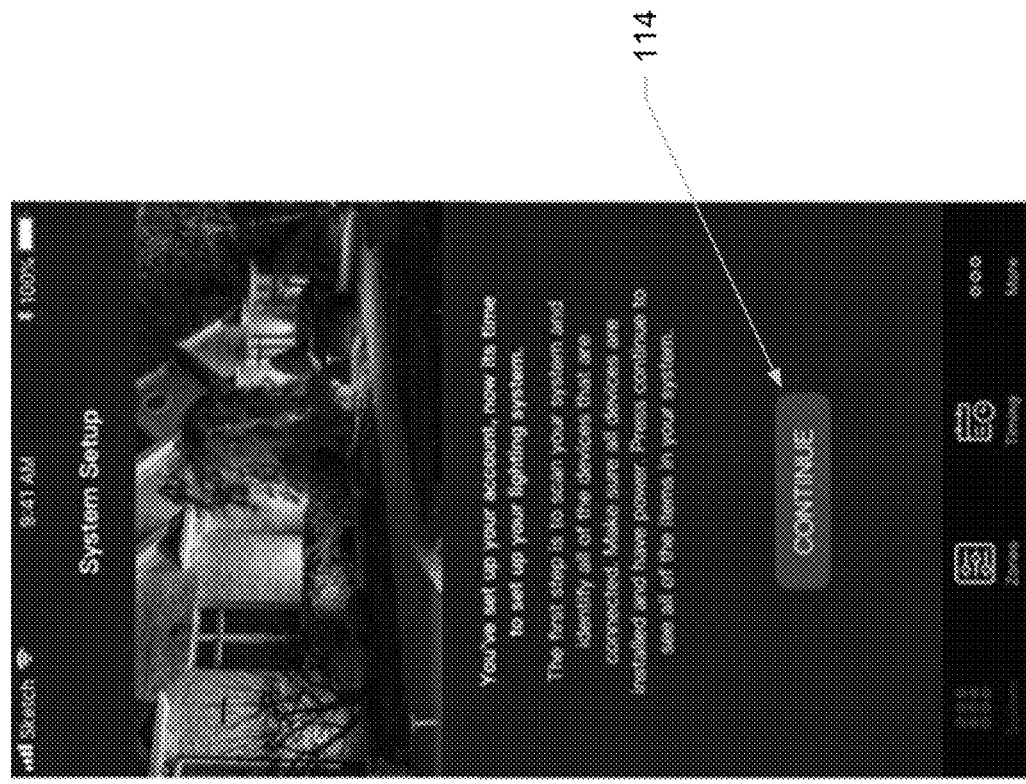

Once the account has been set up and/or logged into, the application may provide instructions to set up the landscape lighting system 80. As depicted in FIG. 13, one or more instructions interfaces may be displayed to walk the user through each step of the process. The user may advance to the set up by selecting a "continue" virtual button 114.

The application may scan the system to identify each of the devices connected to the mesh network of the landscape lighting system 80. In the system user interface 115, depicted in FIG. 14, the application has located switches 116, e.g. lighting control relays 89 (FIG. 8A), clear white (CW) bulbs 118A, e.g. landscape lighting fixtures 81 (FIG. 8A) with clear bulbs and red, green, blue (RGB) bulbs 118B, e.g. landscape lighting fixtures 81 with RGB bulbs. In addition to identifying the components in the landscape lighting system 80, the application may also identify the state of the component, such as on or off. In the depicted example switch 6, CW bulb 4, and an RGB bulb indicate on by the white background. Similarly, switch 5, CW bulb 7, RGB bulb 8, and RGB bulb 3 indicate off by the dark background. In an example embodiment, the application may identify components that have not been previously identified and/or programmed. In the depicted example, CW bulb 7 and RGB bulb 8 indicate "new" identifying these components as either being identified for the first time or not programmed within the application. Programming a component may include naming the component, assigning the component to a zone, or other suitable lighting programming. In some example embodiments, components that have been previously programmed may not be located by the system scan. For example the component may not have power, may be obstructed, may have a fault, preventing the component from connecting to the mesh network. The application may indicate that a previously programmed component is not connected to the mesh network, such as by using an "offline" indicator 120. In the depicted example, RGB bulb 2 has been previously programmed, however the application has not identified RGB bulb 2 in the system scan and, as such, indicates offline. The user may enter a component user interface by selecting a component from the system user interface 115.

FIG. 15 illustrates component user interface 121. In an example embodiment, the component user interface 121 may include a name field 122 for the selected component and a zone assignment 124. The application may assign a default name such as "bulb 2" and/or default zone assignment, such as "default zone," which may be updated by the user. The name field 121 may be a text field enabling the user to give the component any desired name. The zone assignment 124 may be a drop down menu, or similar type of menu, in which the user may select from one or more zones, such as the default zone and zones previously programed by the user. The user may save changes to the name and/or zone assignment by selecting a "save virtual button 126. In response to saving the changes, the application may cause the saved data to be sent to the server to be stored in memory based on the account the user has logged in under.

Figure 17:
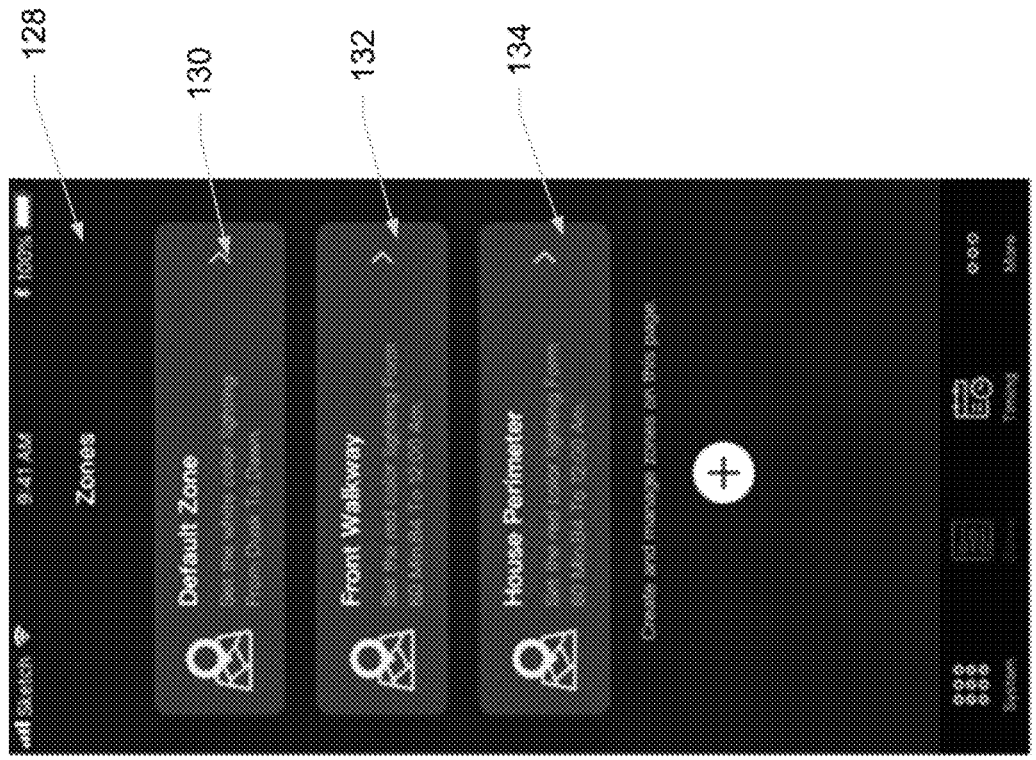
Figure 16:
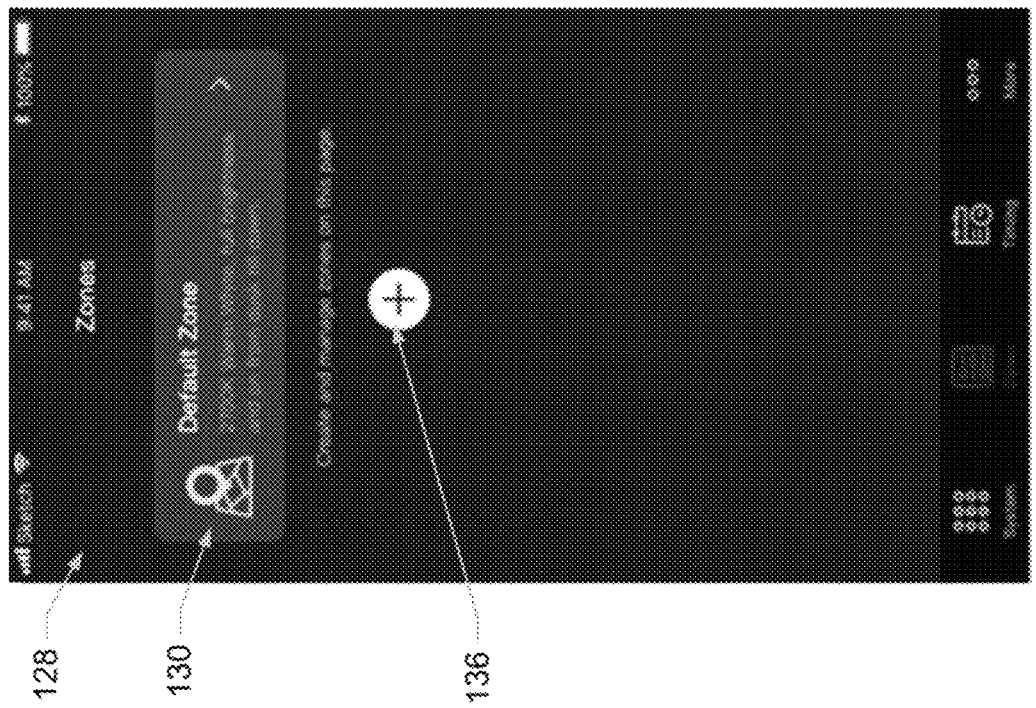

FIGS. 16 and 17 illustrate zone selection user interfaces 128. The zone selection user interface 128 may include one or more zone icons 130, 132, 134 and, in some examples, an add zone icon 136. The zone icons 130, 132, 134 may include the zone name, light temperature, light color, timing, or other relevant information. The application may initially include only a default zone 130, as depicted in FIG. 16. The user may create additional zones by selecting the add zone icon 136. Generating an additional zone is discussed below in reference to FIG. 19. In the example depicted in FIG. 17, the user has created two addition zones that are indicated by the front walkway icon 132 and the house perimeter icon 134.

Figures 18, 19:
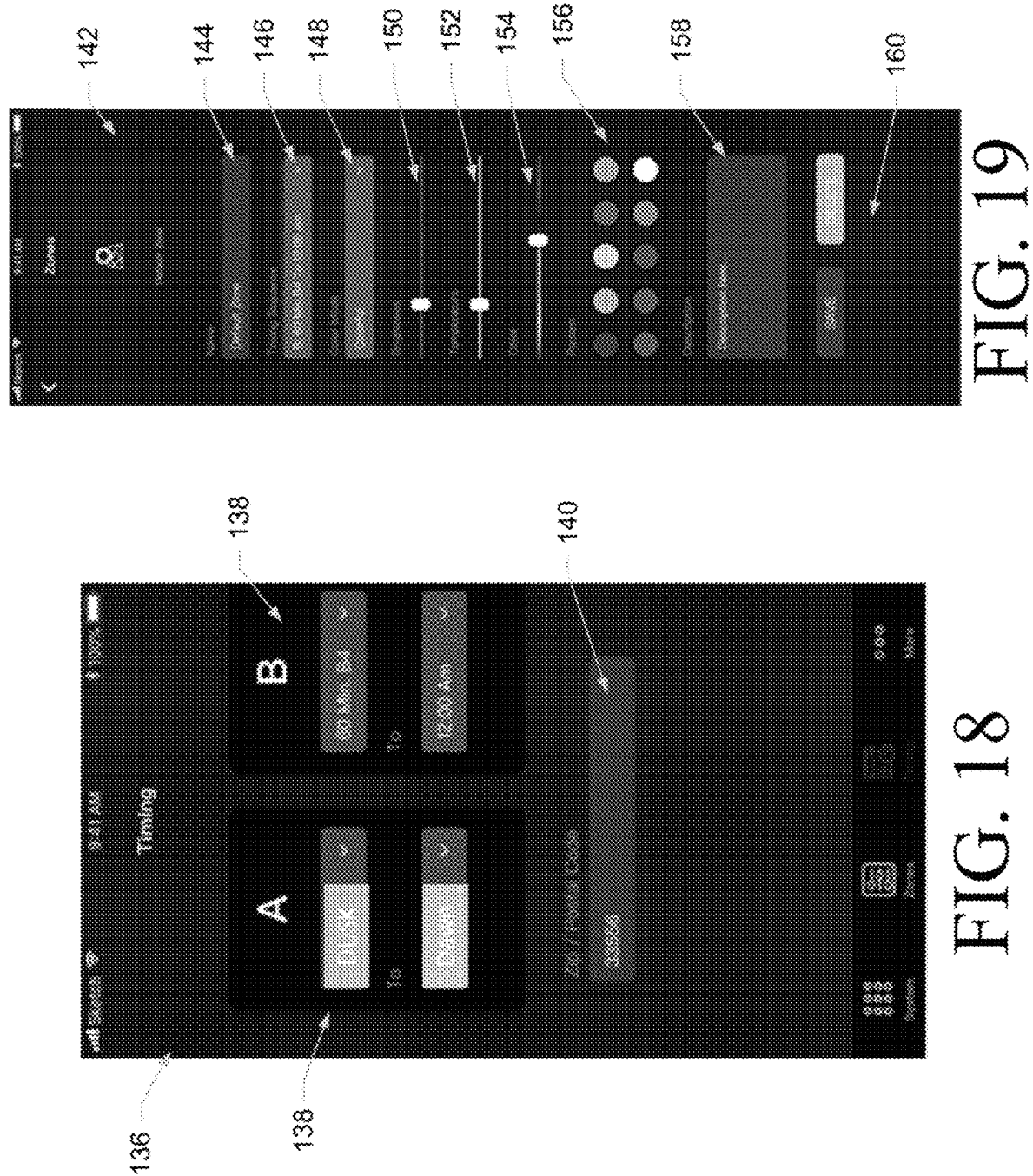

FIG. 18 illustrates a timing user interface 136. The timing user interface may include one or more timing programs 138. In the depicted embodiment, the timing user interface includes two timing programs 138 a program "A" and a program "B". The timing programs may include text fields, drop down menus, or the like for the user to specify the time that the landscape lighting fixtures should turn on and turn off. In the depicted example, program A is set to turn on the landscape lighting fixtures at dusk and turn the landscape lighting fixtures off at dawn. Program B is set to turn the landscape lighting fixture on sixty minutes before dusk and turn the landscape lighting fixtures off at 12:00 AM. The timing user interface 136 may also include a location field 140. The user may provide a zip code, address, or other location information in the location field 140, such that the application can identify the installation location of the landscape lighting system 80. Additionally or alternatively, the application may determine location information based on global positioning data from the computing device 82, a location associated with the modem or IP address, or any other suitable location determination method. The application may cause the server and/or the computing device 82 to determine the dawn and dusk time for the location by accessing one or more databases, such as the U.S. Naval Observatory (USNO) database. The server and/or the computing device 82 may look up the dawn and/or dusk time for the location and date, which may be used for the timing programs. The server and/or computing device may repeatedly determine the times for dusk and dawn, such as once a day, once a week, once a month, or other suitable interval, such that the programed time for dusk and dawn are accurate for the time of year.

FIG. 19 illustrates a zone programing interface 142 including a name field 144, a timing sequence 146, a color mode 148, a brightness selector 150, a temperature selector 152, a color selector spectrum 154, a color selector 156, a description field, and save and delete virtual buttons 160. The user may enter or change a name of the zone by entering a name in the name field 144. In an example embodiment, the name field may be a text field. The user may select a timing schedule for the zone using the timing schedule field 146. The timing schedule field may include a dropdown, or similar, selection menu. The user may select from the timing programs such, as a default timing program, program A, or program B, as discussed in FIG. 18. Additionally or alternatively, interaction with the timing schedule field 146 may cause the application to launch a zone timing interface specific to the current zone, and similar to the timing interface discussed in FIG. 18.

The color mode may be enabled for zone which include at least one multicolor bulb, e.g. RGB bulb. The color mode may allow selection between colorful, white, mix, or other suitable category based on the bulbs assigned to the zone. The brightness selector 150 may be a slider, wheel, text field, or the like enable a value selection within a predetermined range. The brightness selection values may include one or more intensity values based on the bulbs assigned to the zone.

The temperature selector 152 may be a slider, wheel, text field or the like enable a value selection within a predetermined range. The temperature selection values may include one or more temperature values based on the bulbs assigned to the zone. The color selector spectrum 154 may be a slider or wheel, or other adjustable indicator that may be positioned along a color spectrum to select a color value. The color selection values may include one or more color values based on the bulbs assigned to the zone. The color selectors 156 may include one or more color values. The user may select a single color for the zone, a plurality of colors for the zone to cycle through, or a specific color order. In some embodiments, the user may also specify the speed of the color changes or duration for each color, such as by using additional selector interfaces.

The description field may be used to describe the selected values for the zone. For example, a user may make specific selections for a holiday, such as Independence Day with patriotic colors, and wish to reuse the settings at a later time. The description field may allow the user to identify a theme for the zone settings selected. As such, the zone programming interface may include an additional menu to allow the user to select previous zone settings.

The user may save the zone settings or delete the zone settings using the virtual buttons 160. The application may cause the zone settings to be sent to the mesh network and/or the server for storage in memory associated with the user account. The components of the mesh network receiving the zone setting, e.g. control signals, may transmit the control signals throughout the mesh network, as discussed above. The control signals may identify the landscape lighting fixtures, in the zone such as by a network address. The appropriate landscape lighting fixtures, as identified in the control signal, receive and execute the control signals as discussed above.

Figure 20:
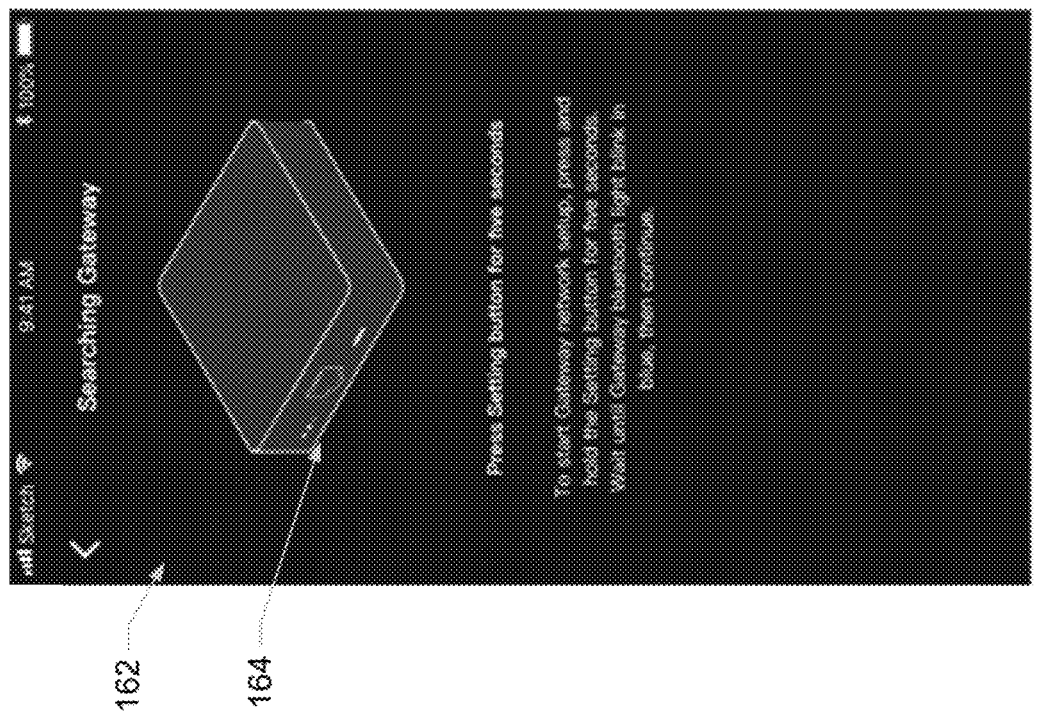

In some embodiments, the application may enable an internet connection to the landscape lighting network. FIG. 20 depicts a communication gateway search interface 162. The user may follow the on screen instructions to identify one or more communication gateways 84 (FIG. 8A). The user may interact with the gateway icon 164 or other interface to cause the application to search the mesh network for one or more communication gateways 84.

Figure 21:
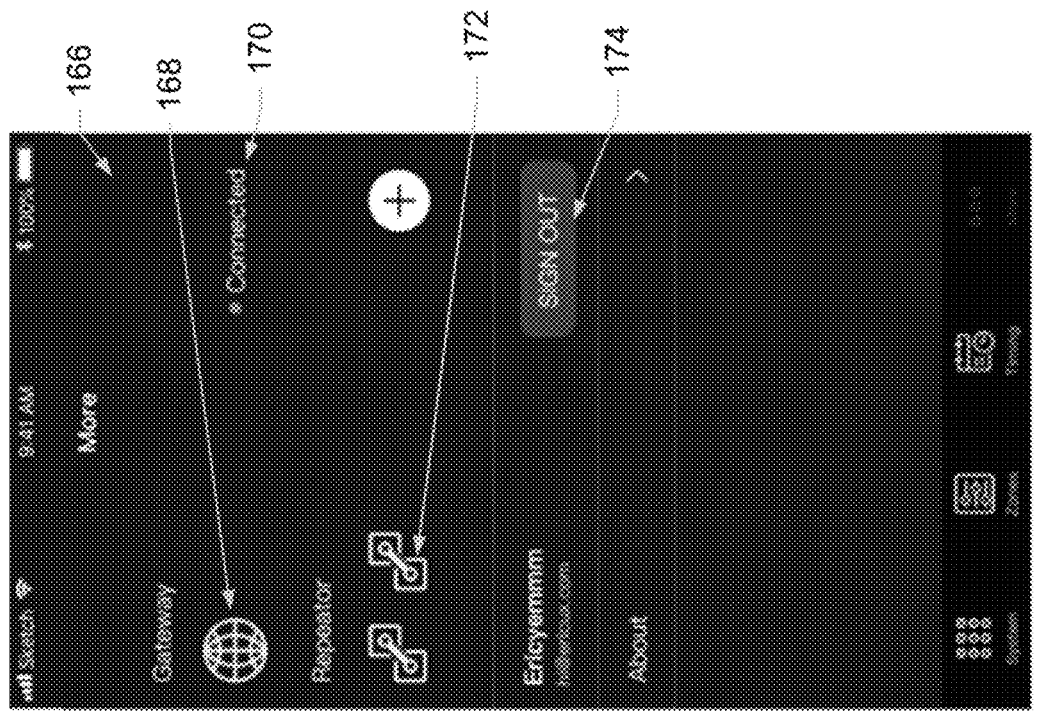
Figure 22:
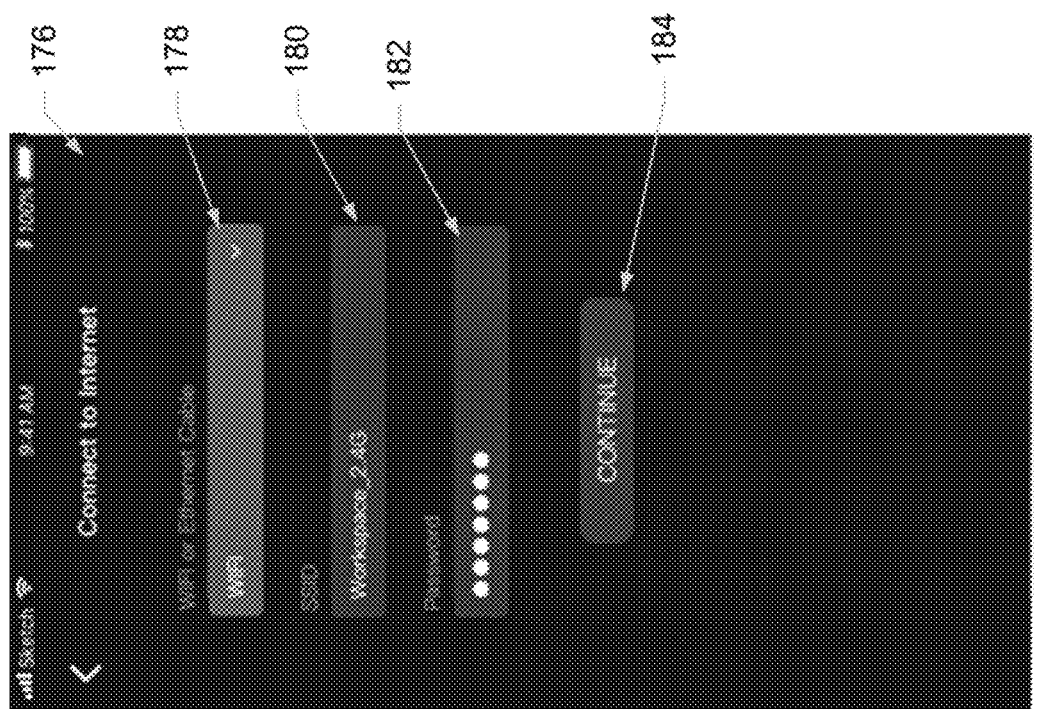

FIG. 21 illustrates a component interface 166. The application may display one or more non-lighting components in the component interface, including but not limited to repeaters 87, security devices, 88, and communication gateways 84 (FIG. 8A). The non-lighting components may be identified in one or more system scans for lighting components, communication gateways, or the like. In the example embodiment, the component interface 166 includes one communication gateway interface 168 and two repeater interfaces 172. The communication gateway interface 168 includes a connected icon indicating that the communication gateway 84 is connected to the internet and/or a local area network. In an example embodiment, the user may control the communication gateway internet connection by interacting with the communication gateway interface 168 opening an internet connection interface 176, as illustrated in FIG. 22. The user may specify the connection type in a connection field 178, such as WiFi or Ethernet. The user may identify the service set identifier (SSID) in an SSID field 180 and provide a password, if necessary, in a password field 182. The user may then select a continue virtual button 184 to cause the application to cause the communication gateway 84 to connect to the internet and/or local area network.

Figure 23:
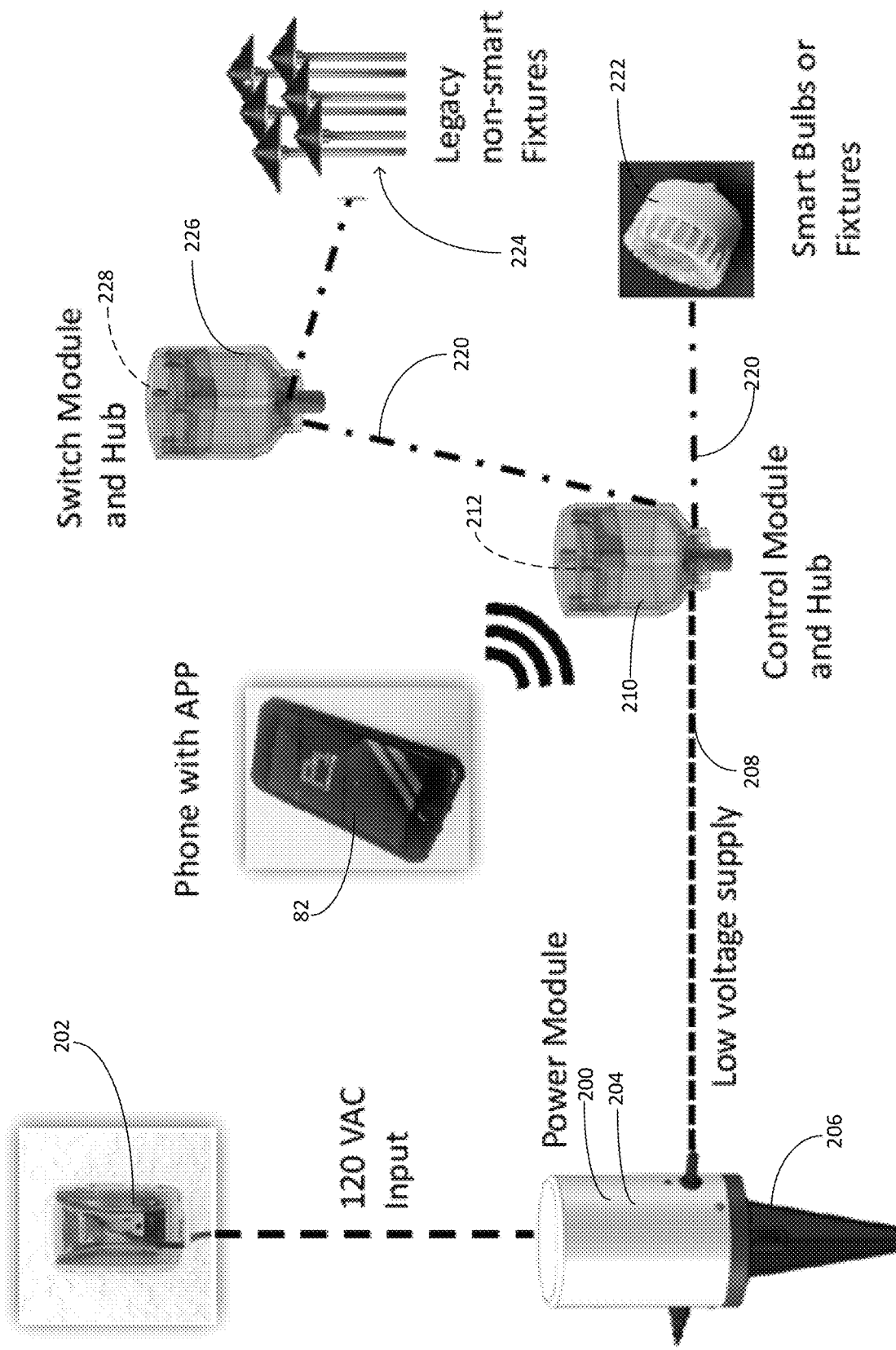
FIG. 23 is a schematic view of a landscape lighting system in accordance with an example embodiment.

Referring now to FIGS. 23 and 24, an alternative embodiment is illustrated which utilizes power line communications (PLC) technology (rather than a mesh network) to control the various fixtures in the overall system. One skilled in the art will appreciate, however, that many aspects of the embodiment of FIGS. 8A and 8B will be equally applicable to this embodiment. Thus, aspects of these two embodiments may be freely substituted as necessary or desired to achieve the desired functionality. As shown in FIG. 23, this simplified schematic depicts a power module that is connected to a household electrical outlet 202 (e.g., a common 120V outlet). Power module 200 contains a transformer that reduces the higher voltage from outlet 202 to a lower AC voltage level as needed by the lighting system. In this embodiment, the transformer is conveniently housed inside a cylindrical housing 204 from which a mounting stake 206 extends. Stake 206 may be pushed into the ground to mount power module 200 at a convenient location.

The low voltage output of power module 200 is fed, as indicated at 208, to a control module 210. Control module 210 includes a control board 212 contained in a suitable environmental housing structure. For example, the housing may have a configuration similar to the junction hub shown and described in aforementioned Ser. No. 15/718,719, in which a lower housing portion and an upper housing portion are connected together. The lower housing portion may include a suitable mounting structure (e.g., a stake or a mounting for a stake) for mounting control module 210 at a suitable location. The control board 212 may be mounted in the underside of the upper housing portion to facilitate wiring connections.

The construction and operation of control board 212 can be most easily explained by referring also to FIG. 24. As shown, circuitry 212 includes a suitable sensor 214, similar to sensor 62, that communicates wirelessly in this case with remote computing device 82 (e.g., utilizing Bluetooth). Sensor 214 is, in turn, in electrical communication with control circuitry 216 which generates control signals for the various fixtures in the overall lighting system. As with the embodiment of FIGS. 8A and 8B, these control signals may be used to turn various fixtures on and off (individually and/or in zones), adjust the brightness or color of the fixtures, etc. These control signals are fed to a combiner 218, along with the low voltage output of the power module 200, to produce a combined signal (as indicated at 220). The combined signal may be fed along a single output line, or a plurality of parallel output lines as necessary or desired in the particular situation.

Referring again to FIG. 23, the landscape lighting system may typically have a plurality of "smart" fixtures 222 similar to fixture 10 described above. These smart fixtures (which may be a "smart bulb" located in a traditional fixture housing) include the necessary electronics to control various lighting parameters, such as brightness or color. Such electronics will include a suitable filter or multiplexer to separate the PLC control signal from the combined signal received along line 220.

In addition, the landscape lighting system may further include a plurality of "dumb" fixtures 224 (such as legacy fixtures previously installed in the system) that simply turn on and off. To control these fixtures, the system preferably includes a switch module 226 which is similar to relay 89 described above. In particular, switch module 226 includes a control board 228 that receives and interprets PLC control signals from control module 210. Based on these signals, switch module 226 turns selected ones of fixtures 224 on or off. Like control module 210, switch module 226 may have a configuration similar to the junction hub shown and described in aforementioned U.S. application Ser. No. 15/718,719, with control board 228 being mounted in the underside of the top housing portion to facilitate wiring connections.

It can thus be seen that the present invention provides various novel aspects of a landscape lighting system. Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

The invention claimed is:

1. A landscape lighting system comprising:
a plurality of controllable lighting fixtures, wherein each of the controllable lighting fixtures comprise:
a light source; and
lighting fixture circuitry configured to:
receive a combined power and control signal over power supply wiring;
separate the control signal from a power component of the combined signal; and
cause the light source to be controlled based on the control signal.

2. A landscape lighting system as set forth in claim 1, wherein the light source of each of the controllable landscape lighting fixtures can be varied in at least one of color and temperature based on the control signal.

3. A landscape lighting system as set forth in claim 2, wherein the light source comprises at least two LEDs of different color temperatures that are separately controlled by the control signal.

4. A landscape lighting system as set forth in claim 2, further comprising a plurality of lenses of different beam angles for interchangeable use with the light source of at least one of the controllable lighting fixtures.

5. A landscape lighting system as set forth in claim 1, further comprising:
a power source operative to supply AC voltage; and
a control module having:
control circuitry operative to generate control signals for the plurality of landscape lighting fixtures; and
a combiner operative to receive power from the power source and the control signals from the control circuitry, said combiner producing the combined power and control signal.

6. A landscape lighting system as set forth in claim 5, wherein said control module includes an environmental housing structure having a lower mounting structure.

7. A landscape lighting system as set forth in claim 5, wherein said control circuitry of said control module includes a sensor operative to communicate wirelessly with a remote computing device.

8. A landscape lighting system as set forth in claim 7, wherein said sensor of said control circuitry is operative to communicate via Bluetooth protocol with said remote computing device.

9. A landscape lighting system as set forth in claim 5, further comprising:
in addition to the plurality of controllable lighting fixtures, said landscape lighting system having at least one non-controllable lighting fixture having a switchable light source that is switched on or off;
a switch module having switch module circuitry configured to:
receive the combined power and control signal over power supply wiring;
separate the control signal from the power component of the combined signal; and
cause the switchable light source to be switched on or off based on the control signal.

10. A landscape lighting system as set forth in claim 9, wherein said at least one non-controllable lighting fixture comprises a plurality of the non-controllable light fixtures respectively wired to the switch module.

11. A landscape lighting system as set forth in claim 5, wherein the power source comprises a power transformer contained within a housing from which a mounting stake extends.

12. A landscape lighting system as set forth in claim 1, wherein the lighting fixture circuitry is contained within a light source housing.

13. A landscape lighting system comprising:
a power source operative to supply AC voltage;
a control module having:
control circuitry operative to generate lighting control signals; and
a combiner operative to receive power from the power source and the lighting control signals from the control circuitry, said combiner producing a combined power and control signal;
a plurality of controllable lighting fixtures, each having a light source and lighting fixture circuitry configured to:
receive the combined power and control signal over power supply wiring;
separate the lighting control signal from a power component of the combined signal; and
cause the light source to be controlled based on the lighting control signal.

14. A landscape lighting system as set forth in claim 13, further comprising:
in addition to the plurality of controllable lighting fixtures, said landscape lighting system having at least one non-controllable lighting fixture having a switchable light source that is switched on or off;
a switch module having switch module circuitry configured to:
receive the combined power and control signal over power supply wiring;
separate the lighting control signal from the power component of the combined signal; and
cause the switchable light source to be switched on or off based on the lighting control signal.

15. A landscape lighting system as set forth in claim 14, wherein said at least one non-controllable lighting fixture comprises a plurality of the non-controllable light fixtures respectively wired to the switch module.

16. A landscape lighting system as set forth in claim 13, wherein the light source of each of the controllable landscape lighting fixtures can be varied in color based on the lighting control signal.

17. A landscape lighting system as set forth in claim 13, wherein the light source comprises at least two LEDs of different color temperatures that are separately controlled by the lighting control signal.

18. A landscape lighting system as set forth in claim 13, further comprising a plurality of lenses of different beam angles for interchangeable use with the light source of at least one of the controllable lighting fixtures.

19. A landscape lighting system as set forth in claim 13, wherein said control module includes an environmental housing structure having a lower mounting structure.

20. A landscape lighting system as set forth in claim 13, wherein said control circuitry of said control module includes a sensor operative to communicate wirelessly with a remote computing device.

21. A landscape lighting system as set forth in claim 20, wherein said sensor of said control circuitry is operative to communicate via Bluetooth protocol with said remote computing device.

22. A landscape lighting system as set forth in claim 13, wherein the power source comprises a power transformer contained within a housing from which a mounting stake extends.

* * * * *